US009832463B2

United States Patent
Pettersson et al.

(10) Patent No.: US 9,832,463 B2
(45) Date of Patent: *Nov. 28, 2017

(54) ROBUST ENCODING AND DECODING OF PICTURES IN VIDEO

(71) Applicant: Telefonaktiebolaget L M Ericsson (publ), Stockholm (SE)

(72) Inventors: Martin Pettersson, Vallentuna (SE); Jonatan Samuelsson, Stockholm (SE); Rickard Sjöberg, Stockholm (SE); Jacob Ström, Stockholm (SE); Ruoyang Yu, Solna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 200 days.

This patent is subject to a terminal disclaimer.

(21) Appl. No.: 14/646,713

(22) PCT Filed: Apr. 13, 2015

(86) PCT No.: PCT/EP2015/057973
§ 371 (c)(1),
(2) Date: May 21, 2015

(87) PCT Pub. No.: WO2015/192989
PCT Pub. Date: Dec. 23, 2015

(65) Prior Publication Data
US 2016/0219273 A1 Jul. 28, 2016

Related U.S. Application Data

(60) Provisional application No. 62/013,581, filed on Jun. 18, 2014.

(51) Int. Cl.
*H04N 19/70* (2014.01)
*H04N 19/58* (2014.01)
(Continued)

(52) U.S. Cl.
CPC ......... *H04N 19/107* (2014.11); *H04N 19/132* (2014.11); *H04N 19/176* (2014.11);
(Continued)

(58) Field of Classification Search
None
See application file for complete search history.

(56) References Cited

U.S. PATENT DOCUMENTS 6,115,420 A 9/2000 Wang
2003/0185303 A1 10/2003 Hall et al.
(Continued)

FOREIGN PATENT DOCUMENTS

WO WO 02/37859 A2 5/2002
WO WO 2014/003379 A1 1/2014

OTHER PUBLICATIONS

Chen Jianle et al. "High efficiency video coding (HEVC) scalable extension draft 3", Joint Collaborative Team on Video Coding (JCT-VC) of ITU-TSG16 WP3 and ISO/IEC JTC1/SC29/WG11, 14th Meeting: Vienna, AT, Jul. 25, 2013-Aug. 2, 2013.
(Continued)

*Primary Examiner* — Reza Aghevli
(74) *Attorney, Agent, or Firm* — Sage Patent Group

(57) ABSTRACT

The present embodiments introduce a new type of random access point in video bitstreams that can be used for random access operations but can be represented in encoded form at a lower bit cost as compared to IRAP pictures. The random access point is a dependent random access point (DRAP) picture that is encoded and decoded as a temporal predictive picture using an IRAP picture and/or a previous, according to a decoding order, DRAP picture as sole reference picture(s) for the DRAP picture. The DRAP picture constitutes a random access point in a video bitstream.

36 Claims, 11 Drawing Sheets

(51) Int. Cl.
  *H04N 19/44* (2014.01)
  *H04N 19/132* (2014.01)
  *H04N 19/593* (2014.01)
  *H04N 19/107* (2014.01)
  *H04N 19/31* (2014.01)
  *H04N 19/176* (2014.01)

(52) U.S. Cl.
  CPC ............. *H04N 19/31* (2014.11); *H04N 19/44* (2014.11); *H04N 19/58* (2014.11); *H04N 19/593* (2014.11); *H04N 19/70* (2014.11)

(56) References Cited

U.S. PATENT DOCUMENTS

| | | | |
|---|---|---|---|
| 2010/0177776 A1 | 7/2010 | Crinon et al. | |
| 2010/0232520 A1 | 9/2010 | Wu et al. | |
| 2015/0103888 A1* | 4/2015 | Chen | H04N 21/4343 375/240.02 |
| 2015/0195555 A1* | 7/2015 | Hendry | H04N 19/46 375/240.16 |
| 2015/0264370 A1* | 9/2015 | Ramasubramonian | H04N 19/33 375/240.02 |
| 2015/0288970 A1* | 10/2015 | Park | H04N 19/105 375/240.13 |
| 2016/0112709 A1* | 4/2016 | Tsukagoshi | H04N 19/70 375/240.12 |
| 2016/0191926 A1* | 6/2016 | Deshpande | H04N 19/597 375/240.12 |
| 2016/0227232 A1* | 8/2016 | Choi | H04N 19/105 |
| 2016/0255373 A1* | 9/2016 | Deshpande | H04N 19/70 |
| 2016/0316211 A1* | 10/2016 | Sychev | H04N 19/50 |

OTHER PUBLICATIONS

Taiwanese Office Action dated Apr. 29, 2016; Foreign Text, 8 Pages.
International Search Report for PCT Application No. PCT/EP2015/057973, dated Jul. 6, 2015, 5 pages.
Written Opinion of the International Searching Authority for PCT Application No. PCT/EP2015/057973, dated Jul. 6, 2015, 8 pages.
Hannuksela: "MV-HEVC/SHVC HLS: On TSA and STSA pictures", 17. JCT-VC Meeting; Mar. 27, 2014-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/,, No. JCTVC-Q0108, Mar. 18, 2014, XP030116026.
Miao Dan et al: "High frame rate screen video coding for screen sharing applications", 2014 IEEE International Symposium on Circuits and Systems (ISCAS), IEEE, Jun. 1, 2014, pp. 2157-2160, XP032624507, DOI: 10.1109/ISCAS.2014.6865595.
Pettersson et al.: "HLS: Dependent RAP indication SEI message", 18. JCT-VC Meeting; Jun. 30, 2014-Sep. 7, 2014; Sapporo; (Joint Collaborative Team on Video Coding of ISO/IEC JTC1/SC29/WG11 and ITU-T SG.16); URL:http://wftp3.itu.int/av-arch/jctvc-site/,, No. JCTVC-R0059, Jun. 19, 2014, XP030116302.
Sjöberg et al.: "HLS: Dependent RAP indication SEI message", 19. JCT-VC Meeting; Oct. 17, 2014-Oct. 24, 2014; Strasbourg; (Joint Collaborative Team on Video Coding of ISO/IEC JTC1/SC29/WG11 and ITU-T SG.16); URL: http://wftp3.itu.int/av-arch/jctvc-site/,, No. JCTVC-S0095, Oct. 8, 2014, XP030116840.
Y-K Wang et al: "On bitstreams starting with CRA pictures", 8. JCT-VC Meeting; 99. MPEG Meeting; Jan. 2, 2012—Oct. 2, 2012; San Jose; Joint Collaborative Team on Video Coding of ISO/IEC JTC1/SC29/WG11 and ITU-T SG.16); URL:http://wftp3.itu.int/av-arch/jctvc-site/,, No. JCTVC-H0496, Jan. 21, 2012, XP030111523.
Sullivan: "CRA pictures with broken links", 100. MPEG Meeting; Apr. 30, 2012-Apr. 5, 2012; Geneva; (Motion Picture Expert Group or ISO/IEC JTC1/SC29/WG11),, No. m24653, Jun. 7, 2012, XP030052996.
Karczewicz et al: "The SP- and SI-frames design for H.264/AVC", IEEE Transactions on Circuits and Systems for Video Technology, IEEE Service Center, Piscataway, NJ, US, vol. 13, No. 7, Jul. 1, 2003, pp. 637-644, XP011099256.
International Search Report, Application No. PCT/EP2015/057975, dated Sep. 25, 2015.
Written Opinion of the International Searching Authority, Application No. PCT/EP2015/057975, dated Sep. 25, 2015.
International Search Report, Application No. PCT/EP2015/057974, dated Jul. 3, 2015.
Written Opinion of the International Searching Authority, Application No. PCT/EP2015/057974, dated Jul. 3, 2015.
Office Action, TW Application No. 104116308, dated Aug. 10, 2016.
Office Action, TW Application No. 104116300, dated Apr. 29, 2016.
Boyce et al., "Output flag location", Document: JCTVC-L0179, Joint Collaborative Team on Video Coding (JCT-VC) of ITU-T SG16 WP3 and ISO/IEC JTC1/SC29/WG11; 12$^{th}$ Meeting: Geneva, CH, Jan. 14-23, 2013, 6 pp.
Fujibayashi et al., "Random access support for HEVC", Document: JCTVC-D234 / WG11 No. m18994, Joint Collaborative Team on Video Coding (JCT-VC) of ITU-T SG16 WP3 and ISO/IEC JTC1/SC29/WG11, 4$^{th}$ Meeting: Daegu, KR, Jan. 20-28, 2011, 8 pp.
Hendry et al., "Random Access Detection and Notification", Document: JCTVC-G159, Joint Collaborative Team on Video Coding (JCT-VC) of ITU-T SG16 WP3 and ISO/IEC JTC1/SC29/WG11; 7$^{th}$ Meeting: Geneva, CH, Nov. 21-30, 2011, 6 pp.
Kazui et al., "Modification of recovery point SEI message", Document: JCTVC-I0044, Joint Collaborative Team on Video Coding (JCT-VC) of ITU-T SG 16 WP3 and ISO/IEC JTC 1/SC 29/WG 11, 9$^{th}$ Meeting: Geneva, CH, Apr. 27-May 7, 2012, 2 pp.
Liang et al., "Low-Latency Streaming of Pre-Encoded Video Using Channel-Adaptive Bitstream Assembly", *IEEE International Conference on Multimedia and Expo*, Aug. 26, 2002, pp. 873-876.
Samuelsson et al., "Restrictions on leading pictures of CRA and BLA", Document JCTVC-J0251, m25579, Joint Collaborative Team on Video Coding (JCT-VC) of ITU-T SG 16 WP3 and ISO/IEC JTC 1/SC 29/WG 11, 10$^{th}$ Meeting; Stockholm, SE, Jul. 11-20, 2012, 4 pp.
Sjöberg et al., "RExt HLS: Picture references across CRA pictures", Document: JCTVC-Q0116_v2, Joint Collaborative Team on Video Coding (JCT-VC) of ITU-T SG16 WP3 and ISO/IEC JTC 1/SC 29/WG11; 17$^{th}$ Meeting: Valencia, ES, Mar. 27-Apr. 4, 2014, 4 pp.
Wang et al., "POC Recovery in Random Access Point SEI Message", Document: JVT-F050 / Filename: JVT-F050.doc, Joint Video Team (JVT) of ISO/IEC MPEG & ITU-T VCEG (ISO/IEC JTC1/SC29/WG11 and ITU-T SG16 Q.6), 6$^{th}$ Meeting: Awaji, Island, JP, Dec. 5-13, 2002, 5 pp.

\* cited by examiner

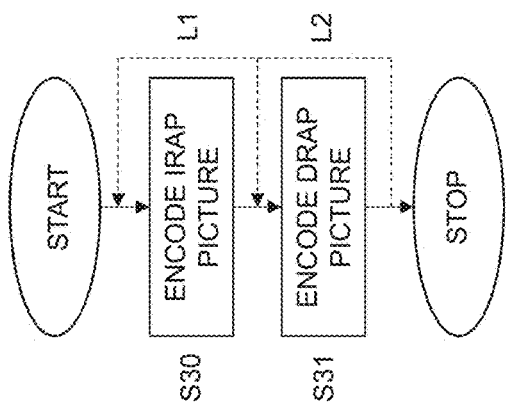
Fig. 5
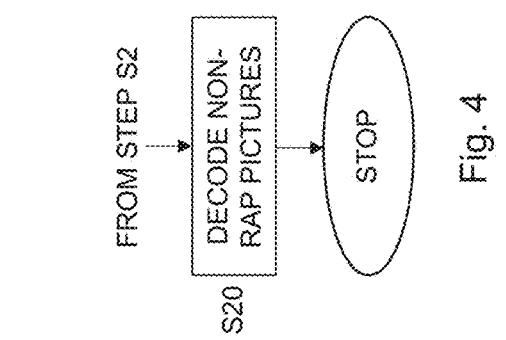
Fig. 4
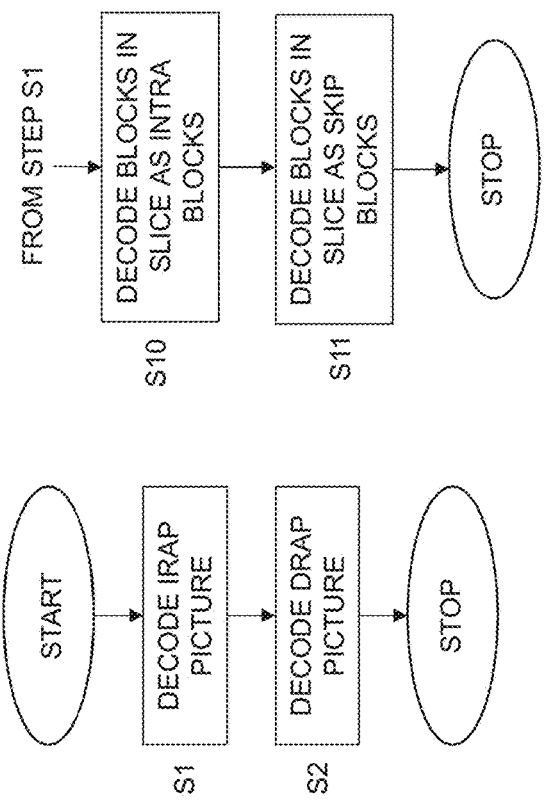
Fig. 3
Fig. 2

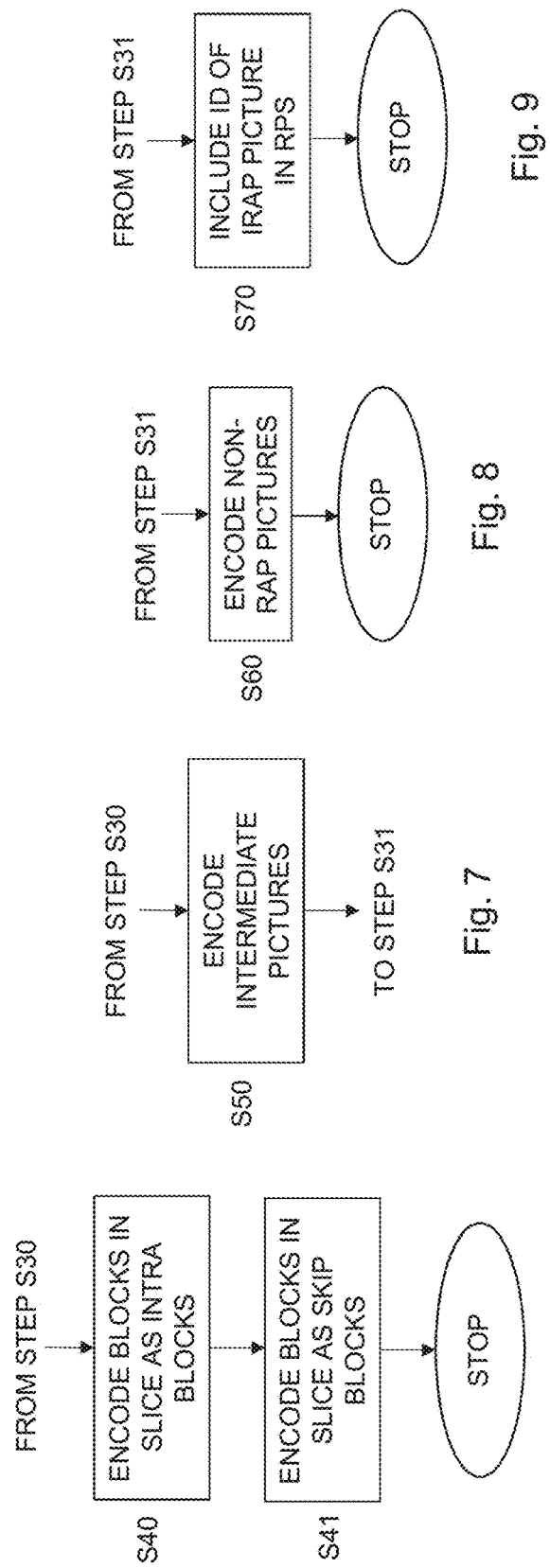

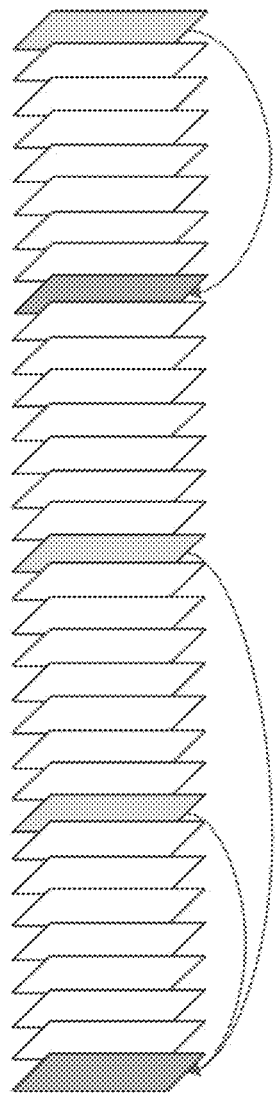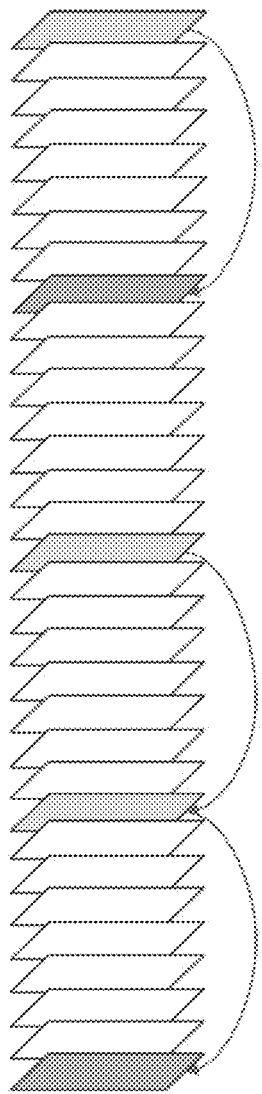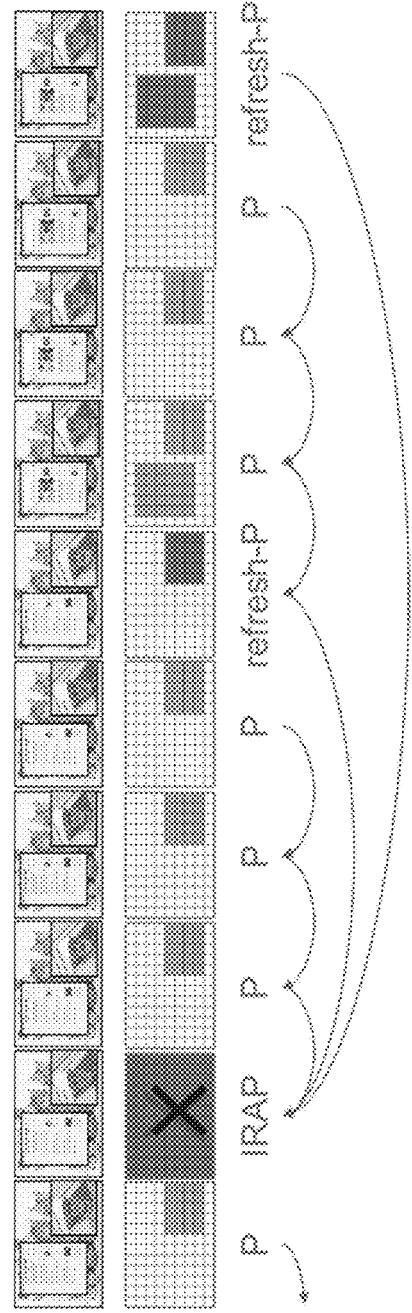
Fig. 11
Fig. 12
Fig. 13

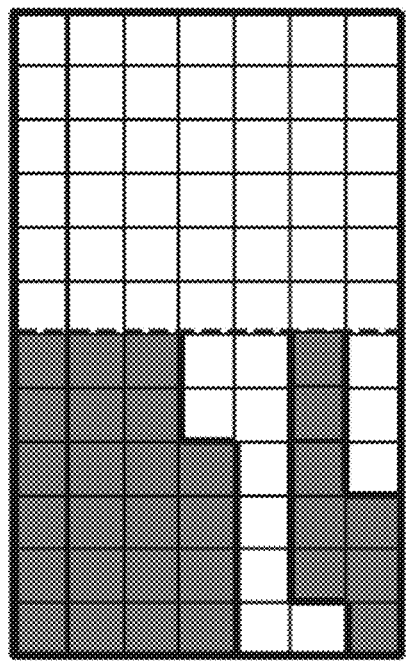
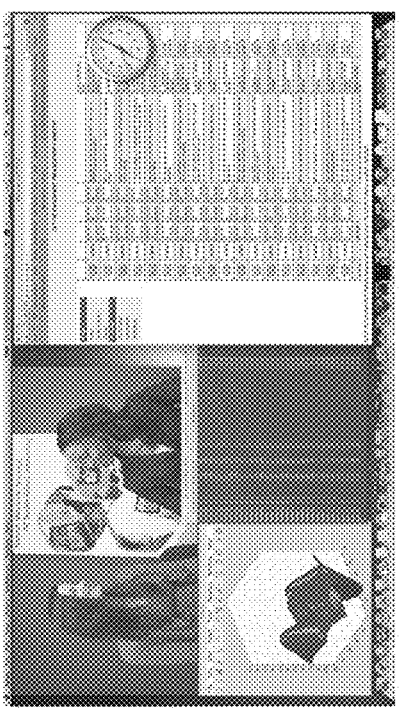
Fig. 14

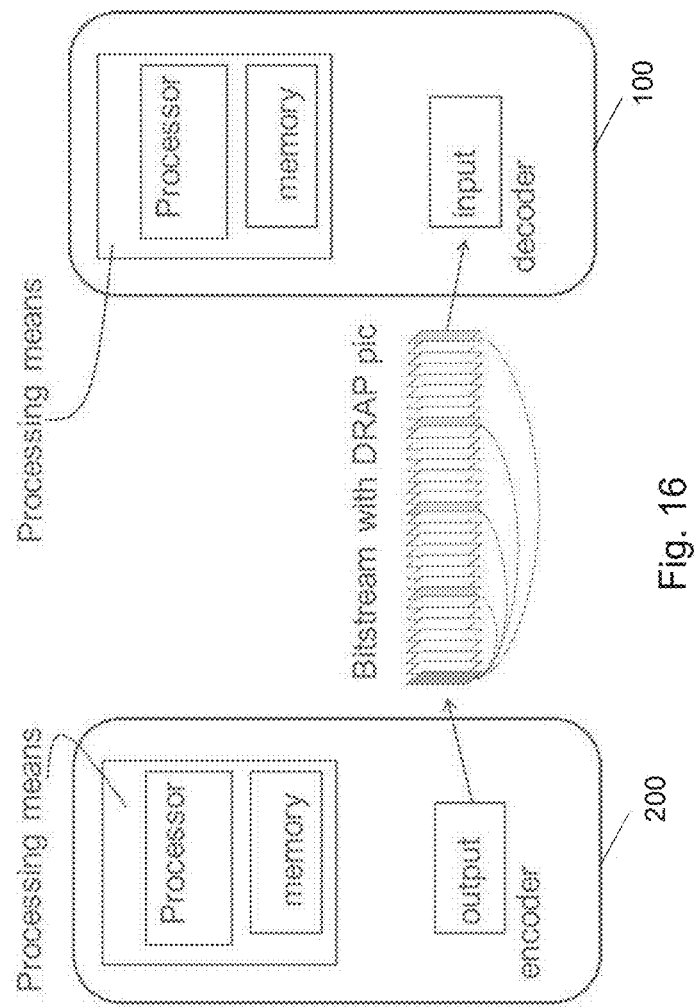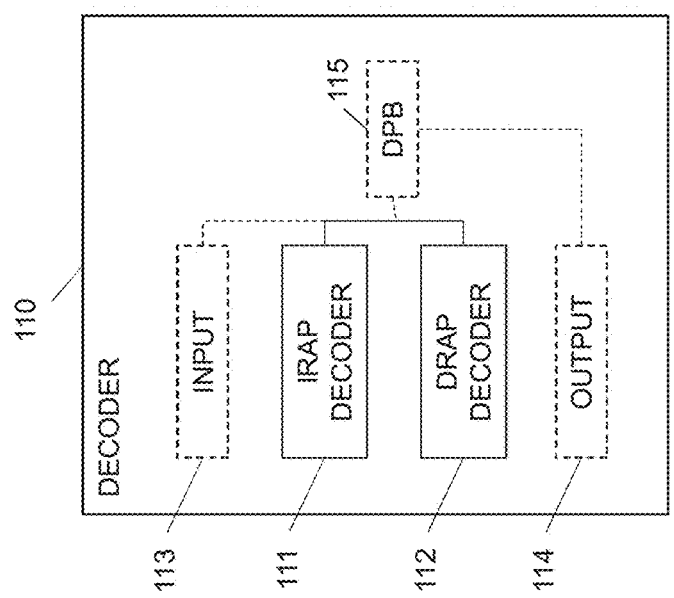

ROBUST ENCODING AND DECODING OF PICTURES IN VIDEO

CROSS REFERENCE TO RELATED APPLICATION

This application is a 35 U.S.C. §371 national stage application of PCT International Application No. PCT/EP2015/057973, filed on 13 Apr. 2015, which itself claims priority to U.S. provisional Patent Application No. 62/013,581, filed 18 Jun. 2014, the disclosure and content of both of which are incorporated by reference herein in their entirety.

TECHNICAL FIELD

The present embodiments generally relate to video coding and decoding, and in particular to introducing and using dependent random access points during such video coding and decoding.

BACKGROUND

The amount of video data sent over internet, broadcasted networks and mobile networks are increasing for every year. This trend is pushed by the increased usage of over-the-top (OTT) services like Netflix, Hulu and YouTube as well as an increased demand for high quality video and a more flexible way of watching TV and other video services.

To keep up with the increasing bitrate demand for video it is important to have good video compression. Recently, JCT-VC in collaboration with MPEG developed the high efficiency video coding (HEVC) version 1 video codec which efficiently cuts the bitrate in half for the same quality compared to its predecessor AVC/H.264.

HEVC, also referred to as H.265, is a block based video codec that utilizes both temporal and spatial prediction. Spatial prediction is achieved using intra (I) prediction from within the current picture. A picture consisting of only intra coded blocks is referred to as an I-picture. Temporal prediction is achieved using inter prediction (P), also referred to as uni-predictive prediction, or bi-directional inter prediction (B), also referred to as bi-predictive prediction, on block level. In inter prediction a prediction is made from a single previously decoded picture. In bi-directional inter prediction the prediction is made from a combination of two predictions that may either reference the same previously decoded picture or two different previously decoded pictures. The previously decoded picture(s) is(are) decoded before the current picture and may come before or after the current picture in display time (output order). A picture containing at least one inter coded block but no bidirectional coded inter blocks is referred to as a P-picture. A picture containing at least one bidirectional inter block is referred to as a B-picture. Both P-pictures and B-pictures may also contain intra coded blocks. For a typical block, intra coding is generally much more expensive in bit cost compared to inter coding, which is generally more expensive than bi-predictive coding.

An instantaneous decoding refresh (IDR) picture is an I-picture for which a following picture may not reference a picture prior to the IDR picture. A clean random access (CRA) picture is an I-picture that allows a random access skipped leading (RASL) picture to reference a picture that follow the CRA picture in decoding order and precedes the CRA picture in display or output order. In case the decoding starts at the CRA picture, the RASL pictures must be dropped since they are allowed to predict from pictures preceding the CRA picture that may not be made available for prediction when the CRA picture is used for random access. Broken link access (BLA) pictures are I-pictures that are used for indicating splicing points in the bitstream. Bitstream splicing operations can be performed by changing the picture type of a CRA picture in a first bitstream to a BLA picture and concatenating the stream at a proper position in the other bitstream.

An intra random access point (IRAP) picture may be any one of IDR, CRA or BLA picture. All IRAP pictures guarantees that pictures that follow the IRAP in both decoding and output order do not reference any picture prior to the IRAP picture in decoding order. The first picture of a bitstream must be an IRAP picture, but there may be many other IRAP pictures throughout the bitstream. IRAP pictures provide the possibility to tune in to a video bitstream, for example when starting to watch TV or switching from one TV channel to another. IRAP pictures can also be used for seeking in a video clip, for example by moving the play position using the control bar of a video player. Moreover, an IRAP picture provides a refresh of the video in case there are errors or losses in the video bitstream.

Specific screen content services, such as screen sharing and screen monitoring, are becoming increasingly popular. Screen content puts different demands on video coding than general video content does. Screen content typically includes windows with sharp edges, graphics and text, distinct colors and tends to have areas of the video picture that are not updated for long periods of time.

FIG. 1 shows a typical screen content scene with windows. For this particular scene the background and some windows like the browser window and the command line window are seldom changed, whereas the video window at the top left and the Matlab simulation at the bottom left may be changed for every picture.

During the development of HEVC version 1 the special characteristics of screen content coding was not explicitly addressed. JCT-VC is therefore now working on an extension to HEVC explicitly targeting screen content coding.

Error robustness can as mentioned above be enforced using IRAP pictures inserted in a periodic manner. For low delay video scenarios it is also common to use periodic intra block updates, which in a periodic way refresh every block of the video image using intra block coding, one or a few blocks at a time. Over time, all blocks in the video image have been intra refreshed. However, for videos with motion, errors are still likely to propagate over long periods of time since the intra blocks are not updated all at the same time.

In HEVC and its predecessors the encoded picture may be divided into slices where each slice may contain one or more coding tree units (CTUs). Each slice is independently encoded from the other slices. Although the main advantage of the slice tool is to provide parallel encoding and decoding, the tool also offers some level of error robustness since an error may not propagate over slice borders.

A problem with both periodic IRAPs and periodic intra block updates in a screen content scenario is that all blocks are refreshed, regardless whether the block has changed since the last refresh or not. For video that has parts that are not updated for long periods of time, such as screen content, this way of encoding becomes unnecessary expensive in terms of bits, since intra coding typically is very expensive in terms of bit cost.

Another problem regarding periodic intra block updates, is that an error occurring in a video with motion may propagate over time since typically only a few blocks are updated at a time.

SUMMARY

It is a general objective to provide an efficient video coding and decoding.

It is a particular objective to provide a new type of random access points in a video bitstream.

These and other objectives are met by embodiments disclosed herein.

An aspect of the embodiments relates to a method for decoding a video bitstream comprising decoding an intra random access point (IRAP) picture of the video bitstream. The method also comprises decoding a dependent random access point (DRAP) picture of the video bitstream as a temporal predictive picture using the IRAP picture and/or a previous, according to a decoding order, DRAP picture in the video bitstream as sole reference picture(s) for the DRAP picture. The DRAP picture constitutes a random access point in the video bitstream.

A related aspect of the embodiments defines a decoder for decoding a video bitstream. The decoder is configured to decode an IRAP picture of the video bitstream. The decoder is also configured to decode a DRAP picture of the video bitstream as a temporal predictive picture using the IRAP picture and/or a previous, according to a decoding order, DRAP picture in the video bitstream as sole reference picture(s) for the DRAP picture. The DRAP picture constitutes a random access point in the video bitstream.

Another related aspect of the embodiments defines a decoder for decoding a video bitstream and comprising an IRAP decoder for decoding an IRAP picture of the video bitstream. The decoder also comprises a DRAP decoder for decoding a DRAP picture of the video bitstream as a temporal predictive picture using the IRAP picture and/or a previous, according to a decoding order, DRAP picture in the video bitstream as sole reference picture(s) for the DRAP picture. The DRAP picture constitutes a random access point in the video bitstream.

Another aspect of the embodiments relates to a method for encoding a video stream. The method comprises encoding an IRAP picture of the video stream and encoding a DRAP picture of the video stream as a temporal predictive picture using the IRAP picture and/or a previous, according to a decoding order, DRAP picture in the video stream as sole reference picture(s) for the DRAP picture. The DRAP picture constitutes a random access point in a video bitstream of encoded pictures of the video stream.

A related aspect of the embodiments defines to an encoder for encoding a video stream. The encoder is configured to encode an IRAP picture of the video stream. The encoder is also configured to encode a DRAP picture of the video stream as a temporal predictive picture using the IRAP picture and/or a previous, according to a decoding order, DRAP picture in the video stream as sole reference picture (s) for the DRAP picture. The DRAP picture constitutes a random access point in a video bitstream of encoded pictures of the video stream.

Another related aspect of the embodiments defines an encoder for encoding a video stream. The encoder comprises an IRAP encoder for encoding an IRAP picture of the video stream. The encoder also comprises a DRAP encoder for encoding a DRAP picture of the video stream as a temporal predictive picture using the IRAP picture and/or a previous, according to a decoding order, DRAP picture in the video stream as sole reference picture(s) for the DRAP picture. The DRAP picture constitutes a random access point in a video bitstream of encoded pictures of the video stream.

A further aspect of the embodiments relates to a computer program comprising instructions, which when executed by a processor cause the processor to decode an IRAP picture of a video bitstream. The processor is also caused to decode a DRAP picture of the video bitstream as a temporal predictive picture using the IRAP picture and/or a previous, according to a decoding order, DRAP picture in the video bitstream as sole reference picture(s) for the DRAP picture. The DRAP picture constitutes a random access point in the video bitstream.

Yet another aspect of the embodiments relates to a computer program comprising instructions, which when executed by a processor cause the processor to encode an IRAP picture of a video stream. The processor is also caused to encode a DRAP picture of the video stream as a temporal predictive picture using the IRAP picture and/or a previous, according to a decoding order, DRAP picture in the video stream as sole reference picture(s) for the DRAP picture. The DRAP picture constitutes a random access point in a video bitstream of encoded pictures of the video stream.

A related aspect of the embodiments defines a carrier comprising a computer program according to above. The carrier is one of an electronic signal, an optical signal, an electromagnetic signal, a magnetic signal, an electric signal, a radio signal, a microwave signal, or a computer-readable storage medium.

The present embodiments provide a new type of random access point (RAP) picture in a video bitstream that can be used to perform a random access operation. This RAP picture is a dependent RAP (DRAP) picture implying that it is a temporal predictive picture encoded and decoded using a previous IRAP picture and/or previous DRAP picture as sole reference picture(s). As a consequence, the DRAP picture can be represented at a significant lower bit cost as compared to IRAP pictures but still constitutes a RAP in a video bitstream.

BRIEF DESCRIPTION OF THE DRAWINGS

The embodiments, together with further objects and advantages thereof, may best be understood by making reference to the following description taken together with the accompanying drawings, in which:

FIG. 2 is a flow chart illustrating a method for decoding a video bitstream according to an embodiment;

FIG. 3 is a flow chart illustrating additional, optional steps of the method shown in FIG. 2;

FIG. 4 is a flow chart illustrating an additional, optional step of the method shown in FIG. 2;

FIG. 5 is a flow chart illustrating a method for encoding a video stream according to an embodiment;

FIG. 6 is a flow chart illustrating additional, optional steps of the method shown in FIG. 5;

FIG. 7 is a flow chart illustrating an additional, optional step of the method shown in FIG. 5;

FIG. 8 is a flow chart illustrating an additional, optional step of the method shown in FIG. 5;

FIG. 9 is a flow chart illustrating an additional, optional step of the method shown in FIG. 5;

FIG. 11 illustrates an example of encoding pattern using DRAP pictures according to an embodiment;

FIG. 12 illustrates an example of encoding pattern using DRAP pictures according to another embodiment;

FIG. 13 illustrates an example of concealing a lost IRAP picture without artifacts according to an embodiment;

FIG. 14 illustrates an example of a typical screen content and division of the video picture into three slices;

FIG. 16 is a schematic overview of an encoder and a decoder according to an embodiment;

FIG. 17 is a schematic block diagram of a decoder according to an embodiment;

DETAILED DESCRIPTION

Figure 1:
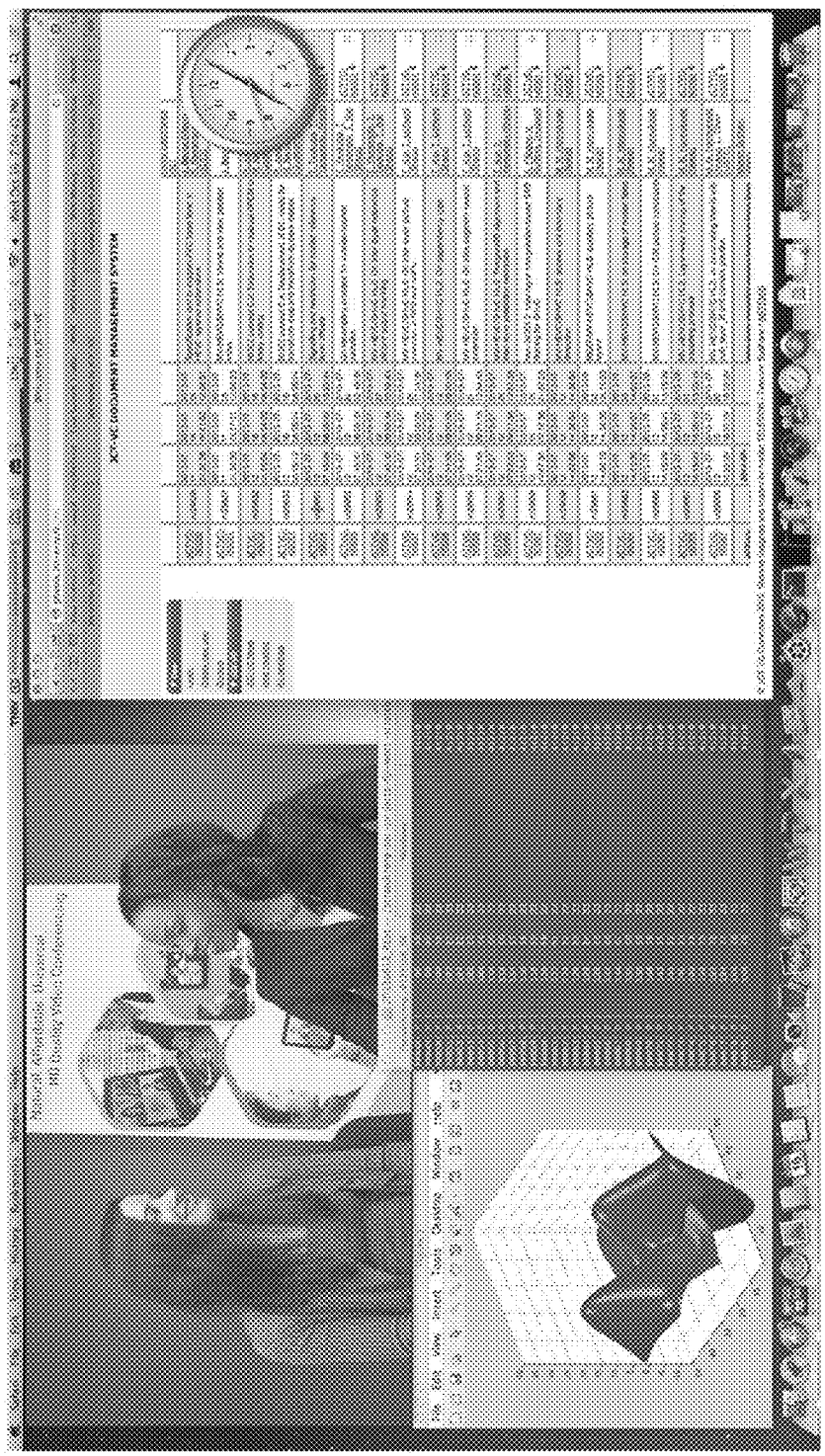
FIG. 1 illustrates an example of a typical screen content.

Throughout the drawings, the same reference numbers are used for similar or corresponding elements.

The present embodiments generally relate to video coding and decoding, and in particular to introducing and using dependent random access points during such video coding and decoding.

The embodiments introduce a new concept with regard to random access points (RAPs) within video coding and decoding. The RAP pictures of the embodiments differ from IRAP pictures that are traditionally used as RAP points in a video bitstream. An IRAP picture is independently decodable, i.e. does not use any reference pictures. The RAPs of the embodiments are dependent RAPs in the form of dependent random access point (DRAP) pictures. Hence, a DRAP picture of the embodiments is not independently decodable, i.e. a DRAP picture uses at least one reference picture, but still constitutes a RAP within a video bitstream. A DRAP picture can be encoded and represented using significantly fewer bits as compared to an IRAP picture. Hence, DRAP pictures of the embodiments may be used to reduce the overall bit cost of a video bitstream or could be used to increase the total number of RAPs in a video bitstream without increasing the overall bit cost.

A DRAP picture differs from other non-IRAP picture in that a DRAP picture is much more restricted in what reference picture(s) it can use. These restrictions enables the DRAP picture to be used for random access operations. A random access operation is when decoding is started not from the beginning of the video bitstream. Instead decoding is started at some position within the video bitstream at a point identified as a random access point. Examples of random access operations include tuning into broadcasted TV streams, i.e. when starting to watch TV, or switching from one TV channel to another.

FIG. 2 is a flow chart illustrating a method for decoding pictures in a video bitstream according to an embodiment. The method comprises decoding an IRAP picture of the video bitstream in step S1. The method then continues to step S2, which comprises decoding a DRAP picture of the video bitstream as a temporal predictive picture using the IRAP picture and/or a previous, according to a decoding order, DRAP picture in the video bitstream as the sole reference picture(s) for the DRAP picture. The DRAP picture decoded in step S2 constitutes a random access point in the video bitstream.

The DRAP picture decoded in step S2 is a temporal predictive picture. This implies that it is decoded using temporal prediction, i.e. the DRAP picture is decoded using at least one reference picture as prediction basis and where the at least one reference picture precedes, in decoding order, the DRAP picture. Hence, there is a temporal distance, with regard to decoding order, between the DRAP picture and the at least one reference picture.

This is in clear contrast to the IRAP picture decoded in step S1. IRAP pictures are independently decodable pictures and thereby does not use any reference pictures for decoding the IRAP pictures. An IRAP picture could therefore, correspondingly, be regarded as an intra predictive or spatial predictive picture. This implies that blocks, i.e. intra blocks, of the IRAP picture are decoded using already decoded blocks within the same IRAP picture.

The DRAP picture decoded in step S2 constitutes, as mentioned above, a RAP in the video bitstream. Hence, it is possible to perform a random access operation at the DRAP picture. Please note that the IRAP picture decoded in step S1 is also a RAP in the video bitstream. The RAP provided by the IRAP picture is, however, an independent RAP implying that the IRAP picture can be decoded without reference to any other picture in the video bitstream. This is in clear contrast to the RAP provided by the DRAP picture, which is a dependent RAP implying that the DRAP picture references a previous IRAP and/or DRAP picture in the video bitstream and is thereby decoded using such previous IRAP and/or DRAP picture as the sole reference picture(s).

Random access operation with a DRAP picture constitutes, in an embodiment, decoding the IRAP picture and/or the previous DRAP picture, i.e. the picture(s) the DRAP picture depend on, followed by decoding the DRAP picture without decoding any other pictures in-between the IRAP picture and the DRAP picture.

The IRAP picture decoded in step S1 and that may be used as reference picture when decoding the DRAP picture in step S2 is thereby a preceding IRAP picture in the video bitstream according to the decoding order. In a particular embodiment, the preceding IRAP picture is the closest preceding IRAP picture according to the decoding order in the video bitstream. The IRAP picture is decoded independently, i.e. without any reference pictures.

The DRAP picture decoded in step S2 in clear contrast has at least one reference picture. This at least one reference picture is either the IRAP picture as decoded in step S1 and/or a previous, according to the decoding order, DRAP picture in the video bitstream. The previous DRAP picture is then positioned in between the IRAP picture and the current DRAP picture according to the decoding order. The DRAP picture may only use this or these pictures as reference pictures and can thereby not reference any other pictures in the video bitstream.

In an embodiment, step S2 comprises decoding the DRAP picture using only a closest preceding, according to the decoding order, IRAP picture in the video bitstream as the sole reference picture for the DRAP picture. In this embodiment, the DRAP picture can only reference the closest preceding IRAP picture in the video bitstream according to the decoding order and only use this particular IRAP picture as reference picture when decoding the blocks of the DRAP picture in step S2.

The DRAP picture may be encoded as a temporal predictive picture having a single reference indication to the closest preceding IRAP picture. This means that the DRAP picture could be regarded as a P-picture but with the important difference that it constitutes a RAP in the video bitstream whereas a P-picture cannot constitute such a RAP. In another example, the DRAP picture could be regarded as a B-picture. In such a case, it may contain blocks that use two references to the same closest preceding IRAP picture instead of only one reference to the closest preceding IRAP picture.

The IRAP picture used as reference picture when decoding the DRAP picture is preferably the closest preceding, according to the decoding order, IRAP picture in the video bitstream. However, in alternative embodiments the IRAP picture used as reference picture by the DRAP picture does not necessarily have to be the closest preceding IRAP picture in the video bitstream but could be a preceding, according to the decoding order, IRAP picture in the video bitstream.

In another embodiment, step S2 comprises decoding the DRAP picture using a closest preceding, according to the decoding order, DRAP picture as the sole reference picture for the DRAP picture. In this embodiment, the DRAP picture can only reference another DRAP picture and this another DRAP picture is the closest preceding DRAP picture in the video bitstream according to the decoding order.

In this particular example, the another DRAP picture may in turn reference a previous DRAP picture or the IRAP picture. Hence, a first DRAP picture following, according to the decoding order, the IRAP picture in the video bitstream references the IRAP picture, the second DRAP picture according to the decoding order references the first DRAP picture and so on.

The DRAP picture may contain a single reference or two references to the preceding DRAP picture depending on whether the DRAP picture is decoded similar as a P-picture (single reference) or B-picture (two references).

In a further embodiment, step S2 comprises decoding the DRAP picture using a closest preceding, according to the decoding order, IRAP picture and a closest preceding, according to the decoding order, DRAP picture as the sole reference pictures for the DRAP picture. In this embodiment, the DRAP picture may reference two different pictures. However, these two different pictures are the closest preceding IRAP and DRAP pictures.

The decoding of the IRAP picture in step S1 of FIG. 2 is preferably performed according to intra modes well known within the field of video decoding. This means that the blocks of the IRAP picture, typically referred to as coding units (CUs) or prediction units (PUs) in the art or more generally blocks of pixels or samples, are decoded according to an intra mode to form decoded blocks where each pixel or sample has at least one pixel or sample value, such as a luminance value and two chrominance values, or red, green and blue values.

The DRAP picture is decoded in step S2 of FIG. 2 using the IRAP picture and/or a preceding DRAP picture as the sole reference picture(s) for the DRAP picture. This means that the DRAP picture is decoded according to an inter mode. This means that the blocks of the DRAP pictures could be in the form of P-blocks, B-blocks or I-blocks.

In a particular embodiment, the DRAP picture is decoded by decoding the blocks of the DRAP pictures as skip blocks using the IRAP picture and/or the previous DRAP picture as the sole reference picture(s) for the DRAP picture or as intra blocks, preferably as skip blocks using the IRAP picture as the sole reference picture for the DRAP picture or as intra blocks.

A skip block implies that the block is encoded according to the skip mode using the IRAP picture and/or preceding DRAP picture as the sole reference picture(s). This means that sample or pixel values for the skip block are copied from the collocated block in the reference picture without any motion compensation. A combination of the skip mode and the intra mode for the blocks of the DRAP picture is thereby an efficient way of encoding and decoding the DRAP picture.

Hence, those blocks of the DRAP picture that have not changed or not changed more than some defined minimum difference relative to the reference picture, such as closest preceding IRAP picture, are preferably encoded and decoded as skip blocks, whereas blocks of the DRAP picture that have changed, or changed more than the defined minimum reference, relative to the reference picture are encoded and decoded as intra blocks.

In an another embodiment, a block of the DRAP picture is encoded as a skip block using the IRAP picture as the sole reference picture for the DRAP picture if a collocated block in the IRAP picture is identical with or does not differ more than a defined threshold from a collocated block in another IRAP picture and is otherwise encoded as an intra block. The another IRAP picture precedes, according to the decoding order, the IRAP picture in the video stream and is preferably the closest preceding IRAP picture that is encoded prior to encoding the IRAP picture. In a particular embodiment, a block of the DRAP picture is encoded as a skip block using the IRAP picture of the video stream as the sole reference picture for the DRAP picture if a collocated block in the IRAP picture is identical with or does not differ more than a defined threshold from a respective collocated block in the another IRAP picture and in intermediate pictures present in between the another IRAP picture and the IRAP picture according to the decoding order and is otherwise encoded as an intra block.

Decoding of a block according to an intra mode, i.e. decoding of an intra block, is preferably performed as specified in section 8.4 Decoding process for coding units coded in intra prediction mode of ITU-T H.265 Series H: Audiovisual and multimedia systems, Infra structure of audiovisual services—Coding of moving video, High efficiency video coding. Decoding of a block according to an inter mode, i.e. decoding of an inter block, such as a skip block, is preferably performed as specified in section 8.5 Decoding process for coding units coded in inter prediction mode of ITU-T H.265 Series H: Audiovisual and multimedia systems, Infra structure of audiovisual services—Coding of moving video, High efficiency video coding. Decoding skip blocks, i.e. block having a value of the skip flag equal to 1, is in particular described in section 8.5.4.1 General of ITU-T H.265 Series H: Audiovisual and multimedia systems, Infra structure of audiovisual services—Coding of moving video, High efficiency video coding.

In HEVC, the skip mode is similar to the new merge mode with the exception that residual data is skipped. The merge mode selects motion parameter from one of four spatial candidates, one temporal candidate and a zero motion candidate. Hence a skipped block is preferably decoded according to the skip mode in HEVC with the zero motion candidate selected.

The DRAP picture is decoded using the IRAP picture and/or the previous DRAP pictures in the video bitstream as sole reference picture(s) for the DRAP picture. This means that the actual decoding of the blocks of the DRAP picture only uses the IRAP picture and/or the previous DRAP picture as reference picture(s).

In an embodiment, the reference picture set (RPS) of the DRAP picture only comprises the IRAP picture and/or previous DRAP picture. This means that the RPS of the DRAP picture will only, in this embodiment, contain identifiers of the picture or those pictures that may be used as reference picture(s) when decoding the blocks of the DRAP picture, i.e. the IRAP picture and/or the previous DRAP picture.

In another embodiment, the RPS of the DRAP picture may comprise the IRAP picture and/or the previous DRAP picture and may additionally contain other previous, according to the decoding order, pictures in the video bitstream. However, the actual decoding of the DRAP picture is, also in this embodiment, performed using only the IRAP picture and/or the previous DRAP picture as reference picture(s) for the DRAP picture even though the RPS may contain other pictures.

In HEVC and other video coding standards using reference picture sets, using a picture as a reference picture corresponds to having an identifier in the so called Curr lists of the RPS, i.e. in RefPicSetStCurrBefore, RefPicSetStCurrAfter or RefPicSetLtCurr. This means that the DRAP picture preferably only has identifier(s) of the IRAP picture and/or the previous DRAP picture in the Curr lists of its RPS. Identifiers of other previous pictures that cannot be used as reference pictures when decoding the DRAP picture may still be present in the RPS, in the Foll lists of the RPS of the DRAP picture, i.e. in PocStFoll or PocLtFoll.

A picture of the video bitstream could comprise one or Multiple, i.e. at least two, slices. A slice can, for the most part, be decoded independent from other slices within the same picture. Slices can therefore be regarded as self-contained in that prediction is not made across slice boundaries.

In a particular embodiment, the DRAP picture decoded in step S2 of FIG. 2 comprises multiple slices. In such a case, the decoding of the DRAP picture may be conducted as shown in the flow chart of FIG. 3. The method continues from step S1 in FIG. 2. A next step S10 comprises decoding blocks of at least one slice in the DRAP picture as intra blocks. Step S11 correspondingly comprises decoding blocks of at least one slice in the DRAP picture as skip blocks using the IRAP picture and/or previous DRAP picture as the sole reference picture(s) for the DRAP picture. Steps S10 and S11 can be performed in any order or at least partly in parallel since slices are preferably independently decodable from each other.

An advantage of this approach is that slices of the DRAP picture with only intra blocks can be signaled as intra slices (I-slices) in the network abstraction layer (NAL) unit header of a NAL unit comprising the encoded video data of the slice. This in turn makes it easier to identify the position of intra blocks in the video bitstream.

FIG. 4 is a flow chart illustrating an additional, optional step of the method shown in FIG. 2. The method continues from step S2 in FIG. 2. A next step S20 comprises decoding at least one non-RAP picture of the video bitstream following the DRAP picture in output order and decoding order. The at least one non-RAP picture does not use any non-RAP pictures preceding the DRAP picture in decoding order in the video bitstream as reference picture.

Thus, the non-RAP pictures following the DRAP picture do not reference any picture preceding the DRAP picture in decoding order except for potentially the IRAP picture and/or previous DRAP picture that is used as reference for the DRAP picture. This means that no non-RAP picture preceding the DRAP picture in decoding order is used as reference picture for any non-RAP pictures following the DRAP picture in output order and decoding order.

Hence, prediction across a DRAP picture is prohibited. Non-RAP pictures that follow the DRAP picture must not use any non-RAP picture that precedes the DRAP picture for prediction.

In a particular embodiment, pictures following the DRAP picture in output order and decoding order may not use any pictures preceding the DRAP picture in decoding order as reference picture with the exception that a following DRAP picture may use the IRAP picture as reference picture.

This restriction in prediction across the DRAP picture enables efficient usage of the DRAP picture as RAP in the video bitstream. If prediction would have been allowed across the DRAP picture then non-RAP pictures following the DRAP picture in decoding and output order might not be correctly decoded since any reference picture preceding the DRAP picture in decoding order might not be available in the DPB.

FIG. 5 is a flow chart illustrating a method for encoding pictures a video stream. The method comprises encoding an IRAP picture of the video stream in step S30. The method further comprises encoding, in step S31, a DRAP picture of the video stream as a temporal predictive picture using the IRAP picture and/or a previous, according to a decoding order, DRAP picture in the video stream as sole reference picture(s) for the DRAP picture. The DRAP picture constitutes a random access point in a video bitstream of encoded pictures of the video stream.

The decoding order specifies the order that pictures of the video bitstream are decoded by a decoder. This order is the same order at which pictures of the video stream are encoded by an encoder. Hence, decoding order may also be referred to as coding or encoding order.

In an embodiment, step S31 comprises encoding the DRAP picture using a closest preceding, according to the decoding order, IRAP picture in the video stream as the sole reference picture for the DRAP picture.

In another embodiment, step S31 comprises encoding the DRAP picture using a closest preceding, according to the decoding order, DRAP picture in the video stream as the sole reference picture for the DRAP picture.

In a further embodiment, step S31 comprises encoding the DRAP picture using a closest preceding, according to the decoding order, IRAP picture and DRAP picture in the video stream as the sole reference pictures for the DRAP picture.

In a particular embodiment, step S31 comprises encoding blocks of the DRAP picture as skip blocks using the IRAP picture and/or the previous DRAP picture as the sole reference picture(s) for the DRAP picture or as intra blocks.

FIG. 6 is a flow chart illustrating an embodiment of the decoding step S31 in FIG. 5 in more detail. In this embodiment, the DRAP picture is divided into multiple slices, of which at least one will be encoded as an I-slice and at least one will be encoded using the skip mode. The method continues from step S30 in FIG. 5. A next step S40 comprises encoding blocks of at least one slice in the DRAP picture as intra blocks. Step S41 comprises encoding blocks of at least one slice in the DRAP picture as skip blocks using the IRAP picture and/or previous DRAP picture as the sole reference picture(s) for the DRAP picture. Steps S40 and S41 can be performed in any order or at least partly in parallel since slice are preferably independently encodable from each other.

FIG. 7 is a flow chart illustrating an additional, optional step of the method shown in FIG. 5 according to an embodiment. The method continues from step S30 in FIG. 5. The following step S50 comprises encoding intermediate pictures present in between the IRAP picture and the DRAP picture according to the decoding order.

These intermediate pictures encoded in step S50 are preferably non-RAP pictures or non-RAP and DRAP pictures. The non-RAP pictures are preferably encoded as P-pictures or B-pictures using an inter mode. This means that the intermediate pictures uses one or more previous, according to the decoding order, reference pictures in the video stream during encoding in step S50. Note, though, that these intermediate pictures encoded in step S50 preferably do not use any reference pictures that precede, according to the decoding order, the IRAP picture encoded in step S30. Hence, prediction across the IRAP picture is preferably prohibited, possible with the exception for any intermediate picture that is encoded as a RASL picture.

Hence, the first intermediate picture encoded in step S50 preferably uses the IRAP picture encoded in step S30 as the sole reference picture. The second intermediate picture encoded in step S50 preferably uses the IRAP picture and/or the first intermediate picture as reference picture(s).

The method then continues to step S31 in FIG. 5 where the DRAP picture is encoded as a temporal predictive picture using the IRAP picture and/or previous DRAP picture as the sole reference picture(s) for the DRAP picture. This means that the video bitstream preferably comprises the IRAP picture followed by a number of intermediate, preferably non-RAP, pictures and then a DRAP picture. The video bitstream preferably additionally comprises a number of following non-RAP pictures and then a second DRAP picture and so on until a picture of the video stream is encoded as a second IRAP picture.

FIG. 8 is a flow chart illustrating an additional, optional step of the method shown in FIG. 5. The method continues from step S31. A next step S60 comprises encoding at least one non-RAP picture of the video stream following the DRAP picture in output order and decoding order. The at least one non-RAP picture is encoded in step S60 by not using any non-RAP picture of the video stream that precedes the DRAP picture in decoding order as reference picture for the non-RAP pictures. Hence, reference across the DRAP picture encoded in step S31 is preferably prevented possibly with the exception that a non-RAP picture may use the IRAP picture encoded in step S30 as reference picture and/or a previous DRAP picture, i.e. a DRAP picture present in between the IRAP picture encoded in step S30 and the DRAP picture encoded in step S31 as reference picture.

In an embodiment, step S31 of FIG. 5 comprises encoding a block of the DRAP picture as a skip block using the IRAP picture (encoded in step S30) as the sole reference picture for the DRAP picture if a collocated block in the IRAP picture is identical with or does not differ more than a defined threshold from a respective collocated block in the intermediate pictures (encoded in step S50) and otherwise encoding the block if the DRAP picture as an intra block.

Hence, in this embodiment a block in the DRAP picture is only encoded using the skip mode if the collocated blocks in previous, according to the decoding order, intermediate pictures up to the IRAP picture are all the same or at least substantially the same, i.e. do not differ from each other more than the defined threshold.

A collocated block is a block in a previous, according to the decoding order, picture that is positioned at the same position within that picture as a block in a current picture. Generally, the position of a block is defined by the pixel or sample position or coordinate of the upper left corner of the block in a coordinate system having origin at the upper left corner of the picture. A block in the current picture and the collocated block in a previous picture preferably also have the same size in terms of number of pixels or samples.

Various techniques can be used in order to verify whether a block in the DRAP picture is identical or sufficiently identical with collocated blocks in the intermediate pictures and the IRAP picture. A first approach is simply to compare the pixel or sample values in the block with the respective pixel or sample values in the collocated blocks. This could, for instance, be performed according to $\Sigma_{i=0}^{m-1}\Sigma_{j=0}^{n-1}|p(i,j)-q(i,j)|\leq T$, wherein $p(i, j)$ represents a pixel or sample value of the block in the DRAP picture and $q(i, j)$ represents a corresponding pixel or sample value of the collocated block loin the intermediate or IRAP picture. In this example, the block and the collocated block both have a size of m×n pixels or samples. If the two blocks are identical the summation will be zero. The two blocks are regarded as being sufficiently identical if the summation is equal to or smaller than the defined threshold T. Hence, if the summation is equal to or smaller than T, preferably equal to zero, for each intermediate picture positioned, according to the decoding order, in between the DRAP picture and the IRAP picture and for the IRAP picture, then the block is encoded as a skip block, otherwise the block is encoded as an intra block.

Instead of direct pixel or sample matching a hash-based comparison could be deployed. In the hash-based comparison, a respective hash value is calculated for a block in the DRAP picture and a collocated block in a previous intermediate picture or the IRAP picture. The hash value is typically calculated using a conventional hash algorithm with the pixel or sample values of the block as input. If the two hash values for the two blocks are the same the blocks are regarded as being identical or sufficiently identical. The advantage of using hash values as compared to direct pixel or sample matching is that the comparison is generally faster.

This approach increases the error robustness by making sure that collocated DRAP blocks for any block that have been changed in the intermediate pictures since the IRAP picture are encoded as intra blocks. In case the IRAP picture is lost, the decoder will likely try to make a concealment of the latest decoded picture for the IRAP picture. In case some parts of the picture was changed between the latest decoded picture and the IRAP picture and the restrictive use of skip blocks as defined above is not applied, the decoded DRAP picture would likely contain some propagated error.

Hence, if the referenced IRAP picture is lost but intermediate pictures prior to the DRAP picture are decoded correctly, the parts of the video stream that have been static since the IRAP picture will likely be correctly concealed by copying the skip blocks from the latest decoded picture. The parts of the video stream that has been changed since the IRAP picture will be refreshed by intra blocks in the DRAP picture.

In another embodiment, a block of the DRAP picture is encoded as a skip block using the closest preceding, according to the decoding order, IRAP picture of the video stream as sole reference picture for said DRAP picture if a collocated block in the IRAP is identical with or does not differ more than a defined threshold from a respective collocated block in an another IRAP picture and otherwise encoding the block of the DRAP picture as an intra block. The another IRAP picture precedes, according to the decoding order, the IRAP picture in the video stream and is preferably the closest preceding IRAP picture that is encoded prior to encoding the IRAP picture.

In a particular embodiment, a block of the DRAP picture is encoded as a skip block using the closest preceding, according to the decoding order, IRAP picture of the video stream as sole reference picture for said DRAP picture if a collocated block in the IRAP is identical with or does not differ more than a defined threshold from a respective collocated block in the another IRAP picture and in intermediate pictures present in between the another IRAP picture and the IRAP picture according to the decoding order and otherwise encoding the block of the DRAP picture as an intra block.

In this particular embodiment, during continuous decoding, if the referenced IRAP picture is lost but the another IRAP picture is decoded correctly, the parts of the video stream that have been static between the another IRAP picture and the referenced IRAP picture will be correctly concealed by copying the skip blocks from the latest decoded picture when reconstructing the lost referenced IRAP picture. The parts of the video stream that has been changed between the another IRAP picture and the referenced IRAP picture will be refreshed by intra blocks in the DRAP picture.

FIG. 9 is a flow chart illustrating an additional, optional step of the method shown in FIG. 5. The method continues from step S31. A next step S70 comprises including an identifier (ID) of the IRAP picture in a reference picture set (RPS) of the DRAP picture. The RPS signals the IRAP picture as a short-term reference picture or a long-term reference picture.

Hence, in this embodiment, the IRAP picture is the sole reference picture for the DRAP picture and is thereby signaled in the RPS of the DRAP picture. The IRAP picture could be signaled as a so called short-term reference picture or a long-term reference picture depending on how long the decoded IRAP picture should be kept stored in a decoded picture buffer (DPB).

In an embodiment, encoding the video stream comprises performing encoding an IRAP picture of the video stream at a first periodic interval, represented by the line L1 in FIG. 5. The method also comprises performing encoding a DRAP picture of the video stream at a second periodic interval that is shorter than the first periodic interval, represented by the line L2 in FIG. 5.

Hence, during encoding of the pictures in the video stream, pictures are encoded as IRAP pictures in step S30 at a first periodicity whereas other pictures in the video stream are encoded as DRAP pictures in step S31 at a second periodicity, i.e. more often than encoding of pictures as IRAP pictures.

For instance, for general video content an IRAP picture could traditionally be inserted every 0.5 to 1 second. According to the embodiments, Most of such IRAP pictures could instead be encoded as DRAP pictures in order to reduce the total bit cost for the video bitstream. For instance, IRAP pictures are instead inserted every 10 to 60 seconds, whereas DRAP pictures are inserted every 0.5 to 1 s.

Periodic IRAP pictures in encoded video may be used for several reasons, for example providing random access operations for channel switching and trick play (fast forward, rewind, jump forward, jump backwards, go to position, etc) and to refresh the encoded video in case of an error.

For video content where only parts of the video is updated over long periods of time, such as for screen content, inserting IRAP pictures in a periodic way could be unnecessary expensive in terms of compression efficiency.

For typical video content, IRAP pictures tend to be around 3-5 times as expensive to encode as P-pictures and around 5-10 times as expensive to encode as B-pictures in terms of bitrate. For screen content coding where some parts of the screen may only be rarely updated, the ratio between the IRAP-pictures and the P- and B-pictures are typically much more as the P- and B-pictures typically contains a lot of skip blocks. The process of refreshing the video with IRAP-pictures is thus relatively very costly in terms of bits for this scenario.

The embodiments below describe a method of encoding a video bitstream that keeps some of the error robustness properties of IRAP picture at the same time as the total bitrate is decreased. The video bitstream is also encoded in such a way that random access operations can be performed in a more frequent interval than the interval of IRAP pictures in the bitstream.

Here below various embodiments will be further described in more detail.

Embodiment 1

In a first embodiment of the current invention the video stream is encoded with at least one IRAP picture and P-pictures that only may reference a previous IRAP picture. The P-pictures with this restriction is henceforth referred to as DRAP pictures or refresh P-pictures.

FIG. 11 shows an example of an encoding pattern for DRAP pictures. IRAP pictures are here inserted every $24^{th}$ picture and DRAP pictures every $8^{th}$ picture. The dark gray pictures are IRAP pictures, the medium gray pictures are DRAP pictures and the white pictures are conventionally coded P- or B-pictures.

Depending on the distance between the DRAP picture and the referenced IRAP picture, the reference to the IRAP picture can either be encoded as a short term picture reference or a long term picture reference.

Figure 10:
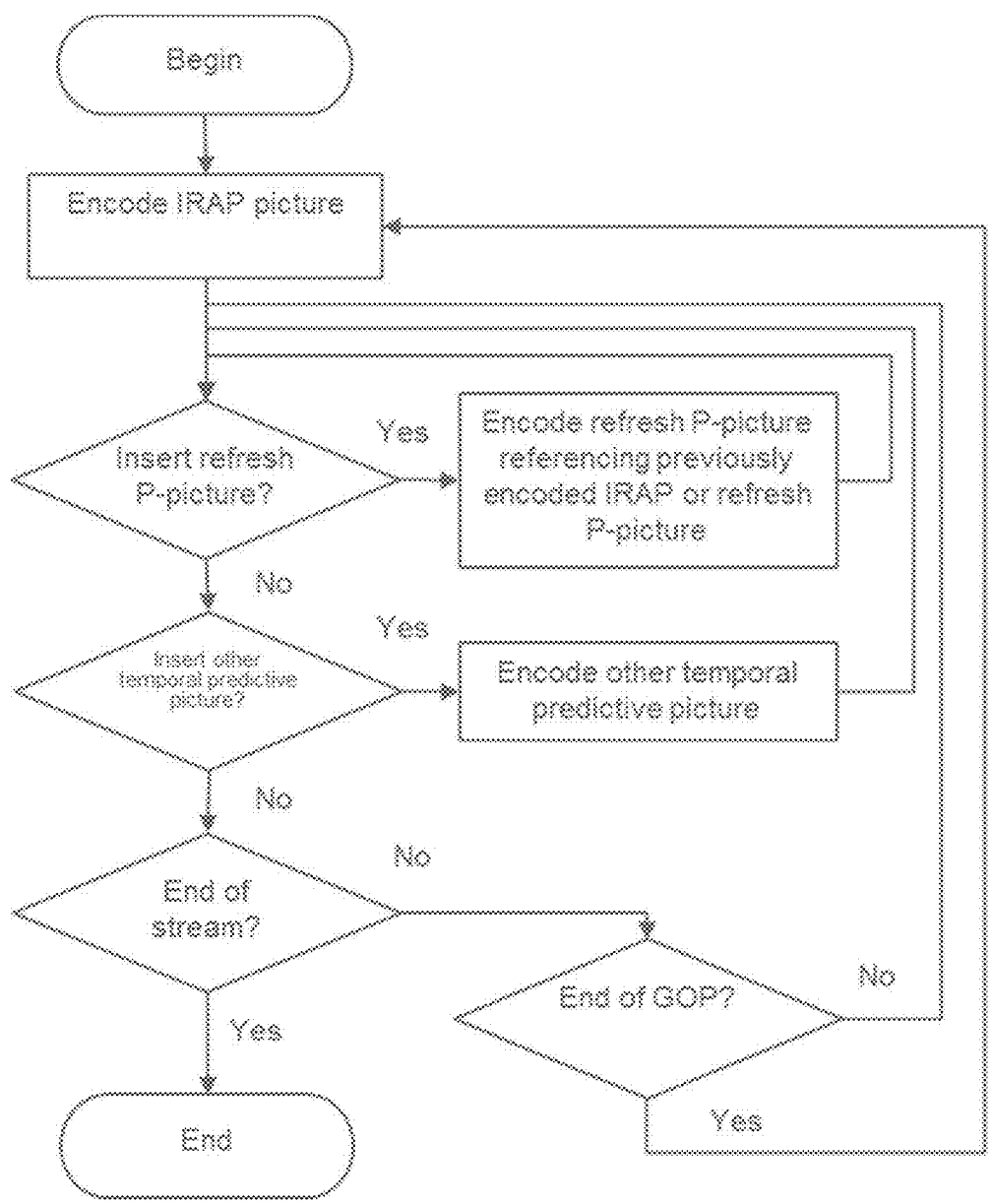
FIG. 10 is a flow chart describing the processing of encoding a video stream according to an embodiment.

FIG. 10 is a flow chart describing the process of encoding a video bitstream according to the first embodiment. The process begins by encoding an IRAP picture at the start of the video bitstream. Then DRAP pictures (denoted refresh P-picture in the figure) and other temporal predictive pictures are encoded in the video bitstream for the group of picture (GOP). GOP is well-known terminology in video coding describing a group of successive pictures in the video stream that starts with an IRAP picture. DRAP pictures may be inserted in periodic intervals according to embodiment 4 below. Each new GOP starts with an IRAP picture.

Hence, a decision is made whether to encode a next picture as a DRAP picture. If so the DRAP picture is encoded referencing only the previously encoded IRAP picture or previously encoded DRAP picture. If the next picture is not encoded as a DRAP picture a decision is made whether to encode it as other temporal predictive picture, i.e. non-RAP P- or B-picture. If so the picture is encoded as such other temporal predictive picture. If the end of the video stream is reached the method ends. If not, a check is made whether the end of GOP is reached. If so the method continues by encoding a new IRAP picture of the following GOP. If not, the method returns by checking whether a next picture is to be encoded as DRAP picture of other temporal predictive picture.

Embodiment 2

In an embodiment the encoded DRAP picture may reference either a previously encoded IRAP picture or another previously encoded DRAP picture. If a DRAP picture is referencing another DRAP picture all IRAP pictures in the dependency chain back to an IRAP picture must be decoded in order to decode the DRAP picture. An encoding pattern for DRAP pictures that may reference a previously encoded DRAP is illustrated in FIG. 12. The dark gray pictures are IRAP pictures, the medium gray pictures are DRAP pictures and the white pictures are conventionally coded P- or B-pictures.

Depending on the distance between the DRAP picture and the referenced IRAP picture or previous DRAP picture, the reference to the IRAP picture or previous DRAP picture can either be encoded as a short term picture reference or a long term picture reference.

Embodiment 3

In an embodiment the encoder encodes the DRAP pictures only with intra blocks or skip blocks where the DRAP picture references either a previously encoded IRAP picture or a previously encoded DRAP picture.

In one version of this embodiment a block in a DRAP picture may only be encoded as a skip block if the collocated block in the previously encoded IRAP picture is identical with a collocated block in all pictures encoded after the IRAP picture up to the DRAP picture. A collocated block is a block in a previous picture that is positioned at the same pixel position as a block in the current picture. If not all collocated blocks in the intermediate pictures are identical with the collocated block in the IRAP picture, the block must be encoded as an intra block.

The encoder needs, thus, to keep track on whether a collocated block has changed since the encoded referenced IRAP picture. To check whether a certain block has changed since the encoded referenced IRAP picture, direct pixel matching or a hash-based comparison method could be deployed. In the hash-based comparison, for each of the two blocks that are to be compared a hash value is calculated using a conventional hash algorithm. If the two hash values for the two blocks are the same, the likelihood that the blocks are an exact match is close to 100%. The advantage of using hash values compared to direct pixel matching is that the search could be faster.

If the referenced IRAP picture is lost but pictures prior to the IRAP picture are decoded correctly, the parts of the video that have been static since the IRAP picture will likely be correctly concealed by copying the skip blocks from the latest decoded picture. The parts of the video that has changed since the IRAP picture will be refreshed by the intra blocks. This is illustrated in FIG. 13.

If an IRAP picture is lost, there is a big chance that the video can be concealed without artifacts at a DRAP picture since skips can only be made where the video is static. Intra blocks are marked in dark gray, inter blocks in gray (some of these may also be intra blocks) and white blocks are skipped blocks.

Embodiment 4

In an embodiment of the current invention the video stream is encoded with both IRAP pictures and DRAP pictures in a periodic way. DRAP pictures are encoded more frequently than IRAP pictures. For instance, DRAP pictures may be inserted every 1-2 seconds in the video bitstream and IRAP pictures every 10-30 seconds.

Embodiment 5

In an embodiment of the current invention, the video image to be encoded using a DRAP picture is divided into slices, such that at least one slice only contains blocks that are intra coded and at least one other slice contains at least one block that is coded as a skip.

FIG. 14 illustrates the partitioning of a video image into intra- and inter-coded slices. Coding tree units (CTUs), sometimes referred to as largest coding units (LCUs), that have changed since the referenced IRAP or DRAP picture are encoded as intra. CTUs that have not changed since the referenced IRAP or DRAP picture are encoded as skip. The left part of FIG. 14 illustrates a typical screen content. In the right part of FIG. 14, the video image or picture has been divided into two tiles with two intra and two inter slices in the first tile and one inter slice in the second tile. The gray blocks are intra coded CTUs and the white blocks are CTUs coded as skip.

The advantage of this approach is that slices with only intra blocks can be signaled as intra slices in the NAL unit header, which makes it easier to identify the position of the intra blocks in the video bitstream.

The down-side with this approach is that slices are divided into CTUs, which is the largest coding unit in HEVC, typically 64×64 pixels. An intra-coded block in the DRAP picture may in this case not have finer granularity than a CTU. In addition intra-frame predictions may not be performed over slice boundaries and the slice structure must be signaled in the video bitstream, which both typically lead to a small increase in bitrate.

Embodiment 6

In an embodiment of the current invention, a DRAP picture is encoded in the video bitstream to allow for random access point operations. In order to decode and use a DRPA picture as a random access point, the referenced IRAP or DRAP picture must first be decoded.

Possible random access operations at the position of a DRAP picture include, but are not limited to, trick play (fast forward, rewind, jump backwards, jump forward and go to position) and channel switching.

In one version of this embodiment the restriction that only intra or skip blocks may be used in the DRAP picture is applied when the DRAP picture is to be used for random access. The computational complexity for performing random access at a DRAP picture is reduced when the DRAP picture is encoded using only intra and skip since no motion compensation and no sub-pixel interpolation needs to be performed during the decoding of the DRAP picture.

Embodiment 7

In an embodiment of the current invention, to identify that a picture is a DRAP picture the decoder checks if the picture only references an IRAP picture or if the picture only references a previously identified DRAP picture.

In another version of this embodiment, to identify that a picture is a DRAP picture the decoder checks whether the picture only has intra coded blocks or blocks encoded with skip referencing an IRAP picture or a picture previously identified as a DRAP picture.

Embodiment 8

In another embodiment of the current invention, the DRAP picture is used as a RAP picture in the video bitstream as in embodiment 6 but used in a closed encoder/decoder system. The encoder and decoder could then have a common understanding at what interval the DRAP pictures should be located. The decoder will then know the positions of the DRAP pictures in advance.

An idea of the proposed solution is to, at certain intervals in the encoded video bitstream, refresh the video using temporal predictive pictures, such as P-pictures. These P-pictures are referred to as refresh P-pictures or DRAP (dependent random access point) pictures. The DRAP pictures have the restriction that they may only reference a previous IRAP picture. In one embodiment the DRAP picture may also reference another DRAP picture.

In an embodiment of the current invention only intra blocks or skip blocks may be used to encode DRAP pictures. Skip blocks may only be used if no change of the current block has occurred since the previous referenced IRAP picture or DRAP picture. Intra coded blocks must thus be used for the parts of the DRAP picture that has changed since the last IRAP picture or DRAP picture.

In additional embodiments of the current invention, the DRAP pictures are encoded to be used for random access operations, where the decoder uses various methods for detecting a DRAP picture in the video bitstream.

IRAP pictures are typically several times more expensive to encode than predictive coding pictures in terms of compression efficiency. An advantage with IRAP pictures is that they do not depend on previous pictures and will thus refresh the video in case of an error in a previous picture. In our solution the error robustness properties from intra coded pictures and the low bitrate demand of predictive coded pictures are combined.

By only skipping blocks that are an identical match with the blocks in a previously decoded IRAP picture or DRAP picture, it is ensured that no errors propagate from the intermediate P- or B-pictures. An IRAP picture would encode all blocks as intra, resulting in a large bitrate overhead compared to a DRAP picture.

Another advantage of embodiments is that the DRAP pictures may be used for random access operations if the referenced IRAP picture is decoded first.

The embodiments are especially useful for content that do not change much over time, such as screen content.

In an embodiment, a method of encoding pictures in a video bitstream is provided. The method comprising:
 encoding an IRAP picture;
 encoding intermediate pictures;
 encoding a temporal predictive picture that only depend on the IRAP picture, the temporal predictive picture being referred to as a DRAP picture.

In an embodiment, the method also comprises encoding an additional temporal predictive picture that only depend on the first DRAP picture, the additional temporal predictive picture also being referred to as a DRAP picture.

In an embodiment, the DRAP picture is being encoded only with intra or skip blocks.

In an embodiment, the DRAP pictures are inserted in a periodic interval, the interval being equal or shorter than the interval of IRAP pictures in the video bitstream.

In an embodiment, the intra coded blocks of a DRAP picture are encoded in at least one intra slice and at least one skip block of the same picture is coded in at least one inter slice.

In an embodiment, a method of decoding pictures in a video bitstream is provided. The method comprises:
 the decoder using the DRAP pictures for a random access operation;
 the decoder determining that the DRAP picture can be used for random access by detecting that it only consists of intra or skip coded blocks.

In an embodiment, a method of decoding pictures in a video bitstream is provided. The method Comprises:
 the decoder using the DRAP picture for a random access operation;
 the decoder determining that the DRAP picture can be used for random access by detecting that it only references an IRAP picture.

In an embodiment, a method for a decoder of decoding pictures in a video bitstream is provided, wherein the decoder is in a closed system with an encoder. The method comprises:
 decoding the video bitstream;
 the decoder using the DRAP picture for a random access operation;
 the decoder determining that the DRAP picture can be used for random access by detecting its position using a predetermined interval.

In an embodiment, the encoder only codes a block with skip coding if the block is identical with the collocated block in the referenced IRAP picture and the collocated blocks in the pictures between the referenced IRAP picture and the DRAP picture.

In an embodiment, the check whether a block in the DRAP picture is identical with a collocated block is performed using a hash algorithm.

IRAP pictures are commonly used in a periodic way to provide random access and error robustness for encoded video. For general video content, IRAP pictures are typically around 3-5 times as expensive to encode as P-pictures and around 5-10 times as expensive to encode as B-pictures in terms of bitrate.

Inserting an IRAP picture every 0.5 to 1.0 seconds cost quite some bits. For sequences where large parts of the image is rarely updated, e.g. some screen content, the ratio between the IRAP pictures and the P- and B-pictures are typically much more as the P- and B-pictures typically contains a lot of skip blocks.

Video services that often have very static content includes screen sharing and surveillance video. Screen sharing could for instance be used as a live communication tool between individuals or could be set up to monitor other computers such as servers. For all these services it is often of interest to record and store the video material. The stored video material should then preferably be easy to search using random access operations. At the same time it is of interest to keep the video bitrate at a minimum, both to limit the bandwidth usage and to save storage space.

The proposed solution aims to decrease the large number of bits that are spent on IRAP pictures in screen content coding (SCC) as well as in general content coding while maintaining almost the same random access and error robustness properties of IRAP pictures. This is done by introducing a new picture type, here called a dependent random access point (DRAP) picture. The DRAP picture is a P-picture that may only reference a previous IRAP picture (and in some embodiments also other DRAP pictures).

The DRAP pictures can replace some of the IRAP pictures to reduce the overall bit cost of a bit stream. Alternatively, random access points can be placed more frequently given the same bitrate. Random access on a DRAP picture is done by first decoding the preceding IRAP picture and then decoding the DRAP picture.

Random access is provided for DRAP pictures with the restriction that the referenced IRAP picture (and if relevant, referenced DRAP pictures) must be decoded before decoding the DRAP picture. The DRAP picture is for instance very useful for fast forwarding through video, at the same time as the bitrate overhead to provide random access is kept to a minimum.

Another preferred restriction is that prediction across DRAP pictures must be prohibited. Non-RAP pictures that follow the DRAP picture must not use any non-RAP picture that precedes the DRAP picture for prediction. One alternative formulation of this restriction is that no non-RAP picture that follow a DRAP picture in both decoding and output order may use any non-RAP picture for reference that precede the DRAP picture in decoding order.

In an embodiment of the invention only intra or skip blocks are allowed for the DRAP picture to provide improved error robustness.

In HEVC, as well as in AVC/H.264, there is a supplemental enhancement information (SEI) message called Recovery Point SEI. The recovery point SEI message assists a decoder in determining when the decoding process will produce acceptable pictures for display after the decoder initiates random access or after the encoder indicates a broken link in the bitstream. When the decoding process is started with the picture in decoding order associated with the recovery point SEI message, all decoded pictures at or subsequent to the recovery point in output order specified in this SEI message are indicated to be correct or approximately correct in content.

Recovery point SEI messages cannot be used to realize the functionality of DRAP pictures. If a recovery point SEI message is sent together with the IRAP picture then all pictures that follow it in decoding order must be decoded up until the DRAP picture, which is not desirable. And the recovery point SEI message cannot be sent together with the DRAP picture since it is not possible to indicate dependency on anything that precedes the recovery point SEI message in decoding order.

According to a first aspect a method for encoding a video stream is provided. In the method an intra random access point (IRAP) picture is encoded, and an inter picture that only depends on the IRAP picture is encoded, wherein the inter picture is referred to as a dependent random access point (DRAP) picture.

According to a second aspect a method for decoding a video bitstream is provided. In the method, an intra random access point (IRAP) picture is decoded, an inter picture that only depends on the IRAP picture is decoded, wherein the inter picture is referred to as dependent random access point (DRAP) picture, and the DRAP picture is used to perform a random access operation.

According to a third aspect, see FIG. 16, an encoder 200 for encoding a video stream is provided. The encoder 200 comprises processing means adapted to encode an intra random access point (IRAP) picture, and encode an inter picture that only depends on the IRAP picture, wherein the inter picture is referred to as a dependent random access point (DRAP) picture.

According to a fourth aspect, see FIG. 16, a decoder 100 for decoding a bitstream is provided. The 100 decoder comprises processing means adapted to decode an intra random access point (IRAP) picture, and decode an inter picture that only depends on the IRAP picture, wherein the inter picture is referred to as dependent random access point (DRAP) picture, and the DRAP picture is used to perform a random access operation.

In the encoder 200 and the decoder 100, respectively, the processing means comprise a processor and a memory wherein said memory is containing instructions, when executed by said processor, are configured to perform the methods described herein.

The encoder 200 may comprise an output unit for sending the encoded video bitstream with control information exemplified by e.g. SEI message and the decoder 100 comprises an input unit for receiving the video bitstream and the control information.

The encoder 200 and the decoder 100, respectively may be located in a device such as a user terminal or a network node. The user terminal may be e.g. a video camera, a mobile phone, or a tablet.

Figure 15:
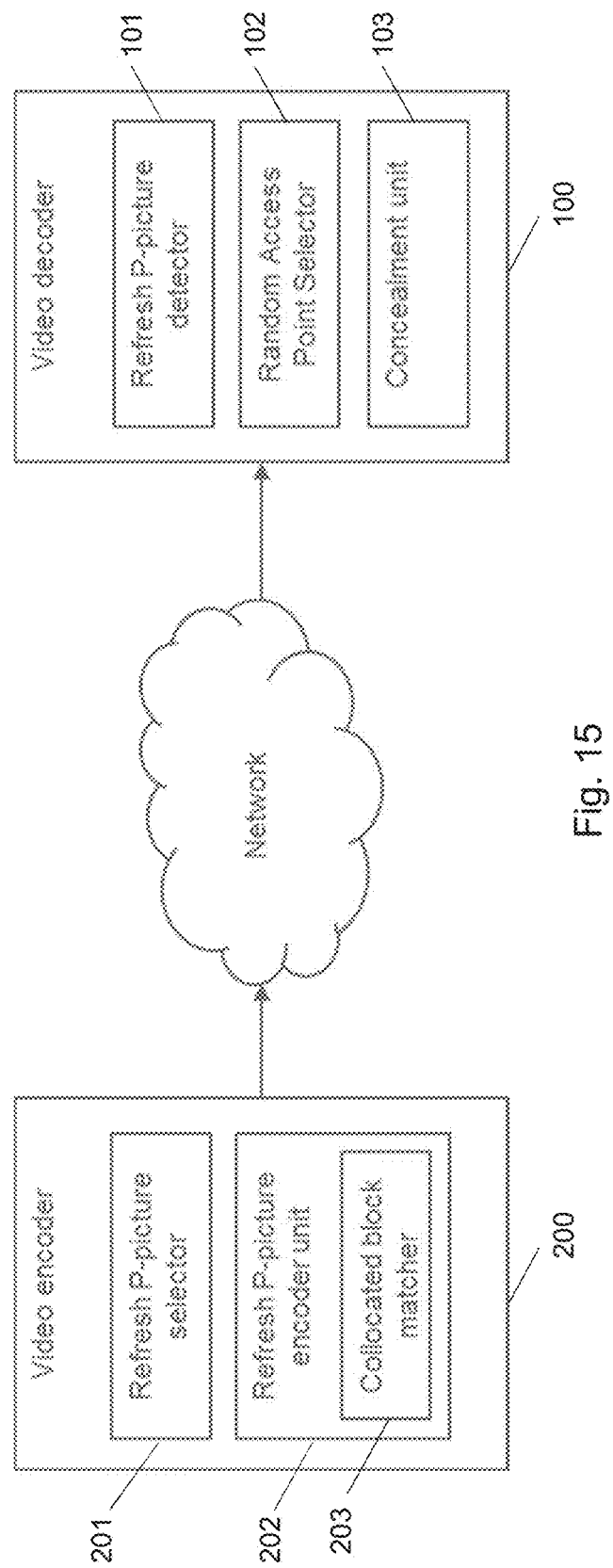
FIG. 15 is a block diagram showing highlighted components of the embodiments.

FIG. 15 is a block diagram showing highlighted components of the invention. A video encoder 200 produces a video bitstream which could be sent over a network and decoded by a video decoder 100. The video encoder 200 contains a refresh P-picture or DRAP selector 201 that determines at what picture positions a DRAP picture should be inserted. The video encoder 200 also contains a refresh P-picture or DRAP encoder unit 202 encoding the DRAP pictures that could contain a collocated block matcher 203 according to embodiment 3. The video decoder 100 could contain a refresh P-picture or DRAP detector 101 according to embodiment 7. The DRAP picture could be used with a random access point selector 102 or a concealment unit 103. The random access point selector 102 determines what random access points are available for random access point operations. The refresh P-picture or DRAP detector 101 could provide the random access selector with DRAP pictures to be added to the set of possible random access points. In case an error occurs in the video bitstream the knowledge that a P-picture is a DRAP picture could aid the concealment unit 103 in concealing the error.

It should be appreciated that the example embodiments may provide for the instructions to be given in a number of ways.

A further aspect of the embodiments relates to a decoder for decoding pictures of a video bitstream. The decoder is configured to decode an IRAP picture of the video bitstream. The decoder is also configured to decode a DRAP picture of the video bitstream as a temporal predictive picture using the IRAP picture and/or a previous, according to a decoding order, DRAP picture in the video bitstream as sole reference picture(s) for the DRAP picture. The DRAP constitutes a random access point in the video bitstream.

In an embodiment, the decoder is configured to decode the DRAP picture using a closest preceding, according to the decoding order, IRAP picture in the video bitstream as the sole reference picture for the DRAP picture.

In an embodiment, the decoder is configured to decode blocks of the DRAP picture as skip blocks using the IRAP picture and/or the previous DRAP picture as sole reference picture(s) for the DRAP picture or as intra blocks.

In a particular embodiment, the decoder is configured to decode blocks of at least one slice in the DRAP picture as intra blocks. The decoder is also configured to decode blocks of at least one slice in the DRAP picture as skip blocks using the IRAP picture and/or the previous DRAP picture as the sole reference picture(s) for the DRAP picture.

In an embodiment, the decoder is configured to decode at least one non-RAP picture of the video bitstream following the DRAP picture in output order and decoding order. The at least one non-RAP picture does not use any non-RAP picture preceding the DRAP picture in decoding order in the video bitstream as reference picture.

Yet another aspect of the embodiments relates to an encoder for encoding pictures in a video stream. The encoder is configured to encode an IRAP picture of the video stream. The encoder is also configured to encode a DRAP picture of the video stream as a temporal predictive picture using the IRAP picture and/or a preceding, according to a decoding order, DRAP picture in the video stream as sole reference picture(s) for the DRAP picture. The DRAP picture constitutes a random access point in a video bitstream of encoded pictures of the video stream.

In an embodiment, the encoder is configured to encode the DRAP picture using a closest preceding, according to the decoding order, IRAP picture in the video stream as the sole reference picture for the DRAP picture.

In an embodiment, the encoder is configured to encode blocks of the DRAP picture as skip blocks using the IRAP picture and/or the previous DRAP picture as the sole reference picture(s) for the DRAP picture or as intra blocks.

In a particular embodiment, the encoder is configured to encode blocks of at least one slice in the DRAP picture as intra blocks. The encoder is also configured to encode blocks of at least one slice in the DRAP picture as skip blocks using the DRAP picture and/or the previous DRAP picture as the sole reference picture(s) for the DRAP picture.

In an embodiment, the encoder is configured to encode intermediate pictures present in between the IRAP picture and the DRAP picture according to the decoding order.

In an embodiment, the encoder is configured to encode a block of the DRAP picture as a skip block using the IRAP picture as the sole reference picture for the DRAP picture if a collocated block in the IRAP picture is identical with or does not differ more than a defined threshold from a respective collocated block in the intermediate pictures and otherwise encode the block of the DRAP picture as an intra block.

In another embodiment, the encoder is configured to encode a block of the DRAP picture as a skip block using the closest preceding, according to the decoding order, IRAP picture as the sole reference picture for the DRAP picture if a collocated block in the IRAP picture is identical with or does not differ more than a defined threshold from a collocated block in an another IRAP picture and otherwise encode the block of the DRAP picture as an intra block. The another IRAP picture is a previous IRAP picture preceding the IRAP picture in decoding order.

In a further embodiment, the encoder is configured to encode a block of the DRAP picture as a skip block using the closest preceding, according to the decoding order, IRAP picture as the sole reference picture for the DRAP picture if a collocated block in the IRAP picture is identical with or does not differ more than a defined threshold from a respective collocated block in an another IRAP picture and in intermediate pictures present in between, according to the decoding order, the another IRAP picture and the IRAP picture in the video stream and otherwise encode the block of the DRAP picture as an intra block. The another IRAP picture is a previous IRAP picture preceding the IRAP picture in decoding order.

In an embodiment, the encoder is configured to encode at least one non-RAP picture of the video stream following the DRAP picture in output order and decoding order. The at least one non-RAP picture does not use any non-RAP picture preceding the DRAP picture in decoding order in the video bitstream as reference picture.

In an embodiment, the encoder is configured to include an identifier of the IRAP picture in a reference picture set of the DRAP picture. The reference picture set signals the IRAP picture as a short-term reference picture or a long-term reference picture.

In an embodiment, the encoder is configured to perform encoding an IRAP picture of the video stream at a first periodic interval and perform encoding a DRAP picture of the video stream at a second periodic interval that is shorter than the first periodic interval.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

FIG. 17 illustrates a particular hardware implementation of a decoder 110 according to the embodiments. In an embodiment, the decoder 110 comprises an IRAP decoder 111 configured to decode the IRAP picture. The decoder 110 also comprises a DRAP decoder 112 configured to decode the DRAP picture.

In FIG. 17, the decoder 110 has been illustrated as comprising a separate IRAP decoder 111 and DRAP decoder 112. In an alternative implementation, the decoder 110 could comprise a single decoding unit that operates on and decodes pictures of a video bitstream regardless of whether the picture is an IRAP picture, a DRAP picture or a non-RAP picture.

The decoder 110 preferably also comprises an input unit 113 configured to receive the video bitstream, typically in the form of a sequence of NAL units carrying encoded video data of the pictures in the video stream and NAL units carrying other control data related to the video bitstream, such a picture parameter set (PPS), sequence parameter set (SPS) and video parameter set (VPS).

The decoder 110 preferably further comprises an output unit 114 configured to output the pictures decoded by the decoder 110 and in particular by the IRAP decoder 111 and DRAP decoder 112. The output unit 114 is preferably configured to output the decoded pictures to a display or screen for display of the video stream. Alternatively, the output unit 114 could output the decoded pictures to a transcoder that is configured to transcode the video stream or to a memory for storage of decoded pictures.

The input unit 113 could be implemented as a receiver or transceiver, in particular for wireless reception of the video bitstream. Alternatively, the input unit 113 could be in the form of a general input or input port, in particular for wired reception of the video bitstream. Correspondingly, the output unit 114 could be implemented as a transmitter or transceiver or a general output or output port.

The decoder 110 preferably also comprises a decoded picture buffer (DPB) 115 that is configured to temporarily store decoded pictures generated by the IRAP decoder 111 or the DRAP decoder 112. The decoded pictures are preferably stored in the DPB 115 to be used as reference picture when decoding subsequent pictures in the video bitstream and/or stored until the pictures should be output according to the output order.

The input unit 113 is preferably connected to the IRAP decoder 111 and the DRAP decoder 112 to forward received pictures thereto for decoding. The IRAP decoder 111 and the DRAP decoder 112 are connected to the DPB 115 in order to store decoded pictures in the DPB 115 and the DRAP decoder 112 may access a previously decoded IRAP picture and/or DRAP picture during decoding of a current DRAP picture. The output unit 114 is preferably connected to the DPB 115 to output decoded pictures from the DPB 115 according to the output order.

Figure 20:
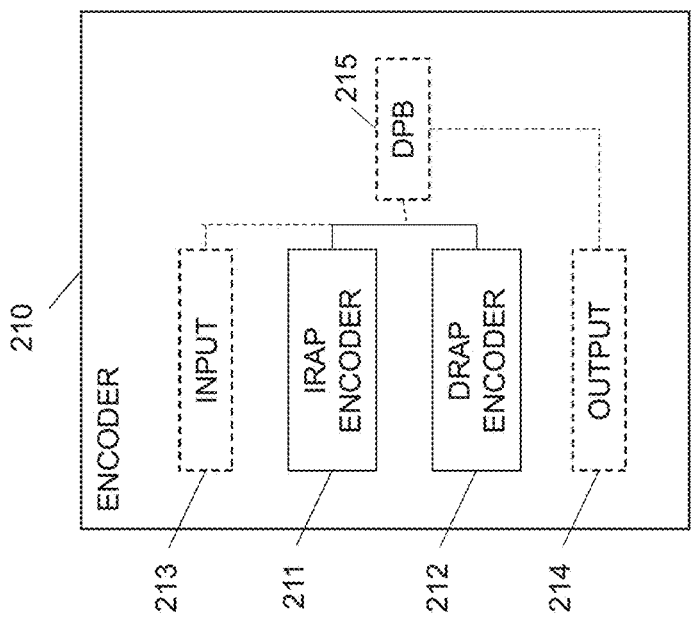
FIG. 20 is a schematic block diagram of an encoder according to an embodiment.

FIG. 20 illustrates a corresponding hardware implementation of an encoder 210 according to the embodiments. In an embodiment, the encoder 210 comprises an IRAP encoder 211 configured to encode the IRAP picture. The encoder 210 also comprises a DRAP encoder 212 configured to encoder the DRAP picture.

In FIG. 20, the encoder 210 has been illustrated as comprising a separate IRAP encoder 211 and DRAP encoder 212. In an alternative implementation, the encoder 210 could comprise a single encoding unit that operates on and encodes pictures of a video stream regardless of whether the picture is an IRAP picture, a DRAP picture or a non-RAP picture.

The encoder 210 preferably also comprises an input unit 213 configured to receive the video stream. The encoder 210 preferably further comprises an output unit 214 configured to output the video bitstream, typically in the form of a sequence of NAL units carrying encoded video data of the pictures in the video stream and NAL units carrying other control data related to the video bitstream.

The input unit 213 could be implemented as a receiver or transceiver or a general input or input port. Correspondingly, the output unit 214 could be implemented as a transmitter or transceiver or a general output or output port.

The encoder 210 preferably also comprises a DPB 215 that is configured to temporarily store decoded or reconstructed pictures generated during the encoding of the video bitstream.

The input unit 213 is preferably connected to the IRAP encoder 211 and the DRAP decoder 212 to forward received pictures thereto for encoding. The IRAP encoder 211 and the DRAP decoder 212 are connected to the DPB 215 in order to store decoded or reconstructed pictures in the DPB 115. The output unit 214 is preferably connected to the IRAP encoder 211 and the DRAP encoder 212 to output the video bitstream of encoded pictures.

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 18:
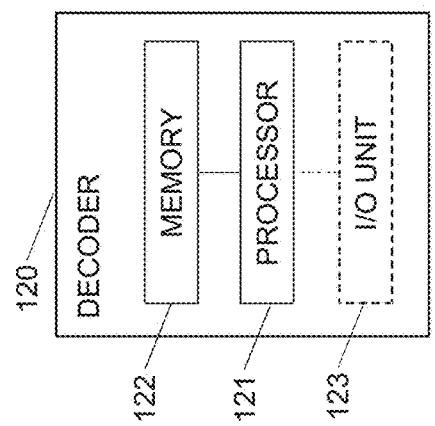
FIG. 18 is a schematic block diagram of a decoder according to another embodiment.

In a particular example, the decoder 120, see FIG. 18, comprises a processor 121 and a memory 122 comprising instructions executable by the processor 121. The processor 121 is operative to decode the IRAP picture and decode the DRAP picture.

In an embodiment, the decoder 120 also comprises an input/output (I/O) unit 123 configured to receive the video bitstream and to output decoded pictures.

The memory 122 of the decoder 120 preferably comprises the DPB used by the processor 121 in order to store and access decoded pictures.

In a particular embodiment, the processor 121 is operative, when executing the instructions stored in the memory 122 to perform the above described operations. The processor 121 is thereby interconnected to the memory 122 to enable normal software execution.

Figure 21:
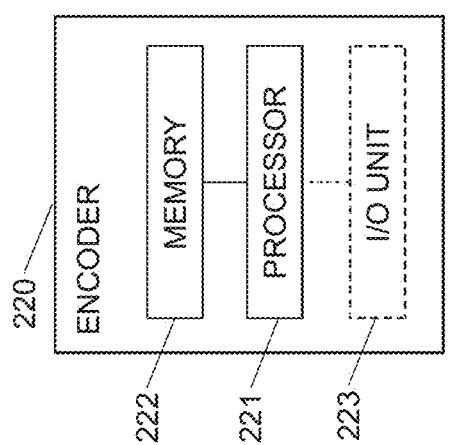
FIG. 21 is a schematic block diagram of an encoder according to another embodiment.

In a corresponding particular example, the encoder 220, see FIG. 21, comprises a processor 221 and a memory 222 comprising instructions executable by the processor 221. The processor 221 is operative to encoder the IRAP picture and encoder the DRAP picture.

In an embodiment, the encoder 220 also comprises an input/output (I/O) unit 223 configured to receive the video stream and to output the video bitstream.

The memory 222 of the encoder 220 preferably comprises the DPB used by the processor 221 in order to store decoded or reconstructed pictures.

In a particular embodiment, the processor 121 is operative, when executing the instructions stored in the memory 222 to perform the above described operations. The processor 221 is thereby interconnected to the memory 222 to enable normal software execution.

Figure 23:
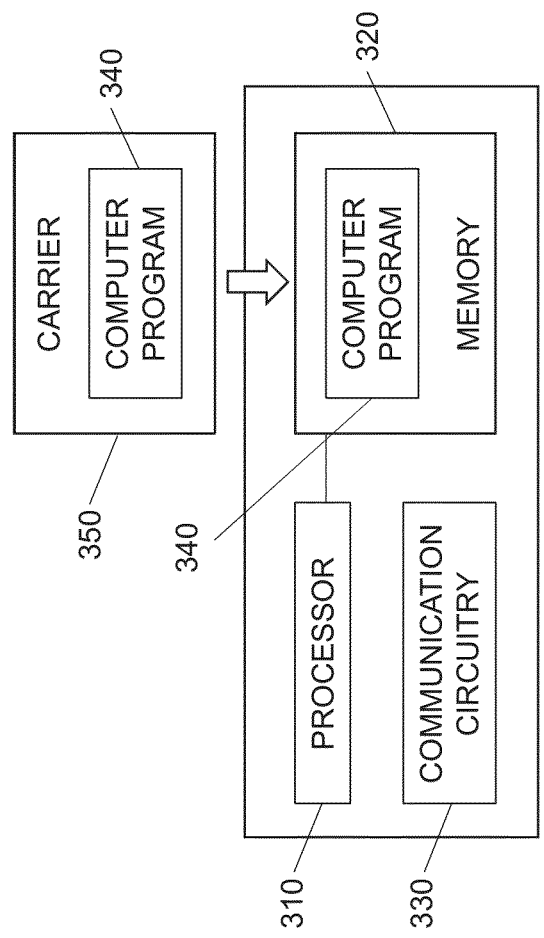
FIG. 23 schematically illustrates a computer program implementation according to an embodiment.

FIG. 23 is a schematic block diagram illustrating an example of a user equipment (UE) 300 comprising a processor 310, an associated memory 320 and a communication circuitry 330.

In this particular example, at least some of the steps, functions, procedures, modules and/or blocks described herein are implemented in a computer program 340, which is loaded into the memory 320 for execution by processing circuitry including one or more processors 310. The processor 310 and memory 320 are interconnected to each other to enable normal software execution. A communication circuitry 330 is also interconnected to the processor 310 and/or the memory 320 to enable input and/or output of a video bitstream and decoded pictures or of a video stream and a video bitstream, respectively.

In an embodiment, the user equipment 300 can be any device or apparatus that can receive and process a video bitstream. For instance, the user equipment 300 could be a computer, either stationary or portable, such as laptop, a smart phone, a tablet, a set-top box, etc. In another embodiment, the user equipment 300 can be any device or apparatus that can receive and process a video stream. For instance, the user equipment 300 could be a computer, either stationary or portable, such as laptop, a smart phone, a tablet, a video camera, etc.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In an embodiment, the computer program 340 comprises instructions, which when executed by the processor 310, cause the processor 310 to decode an IRAP picture of a video bitstream. The processor 310 is also caused to decode a DRAP picture of the video bitstream as a temporal predictive picture using the IRAP picture and/or a previous, according to a decoding order, DRAP picture in the video bitstream as sole reference picture(s) for the DRAP picture. The DRAP picture constitutes a random access point in the video bitstream.

In another embodiment, the computer program 340 comprises instructions, which when executed by the processor 310, cause the processor 310 to encode an IRAP picture of a video stream. The processor 310 is also caused to encode a DRAP picture of the video stream as a temporal predictive picture using the IRAP picture and/or a previous, according to a decoding order, DRAP picture in the video stream as sole reference picture(s) for the DRAP picture. The DRAP constitutes a random access point in the video bitstream.

The proposed technology also provides a carrier 350 comprising the computer program 340. The carrier 350 is one of an electronic signal, an optical signal, an electromagnetic signal, a magnetic signal, an electric signal, a radio signal, a microwave signal, or a computer-readable storage medium 350.

By way of example, the software or computer program 340 may be realized as a computer program product, which is normally carried or stored on a computer-readable medium 340, preferably non-volatile computer-readable storage medium 350. The computer-readable medium 350 may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device. The computer program 340 may thus be loaded into the operating memory of a computer or equivalent processing device, represented by the user equipment 300 in FIG. 23, for execution by the processor 310 thereof.

The flow diagram or diagrams presented herein may therefore be regarded as a computer flow diagram or diagrams, when performed by one or more processors. A corresponding decoder or encoder may be defined as a group of function modules, where each step performed by the processor corresponds to a function module. In this case, the function modules are implemented as a computer program running on the processor. Hence, the decoder or encoder may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. Examples of such function modules are illustrated in FIGS. 19 and 22.

Figure 19:
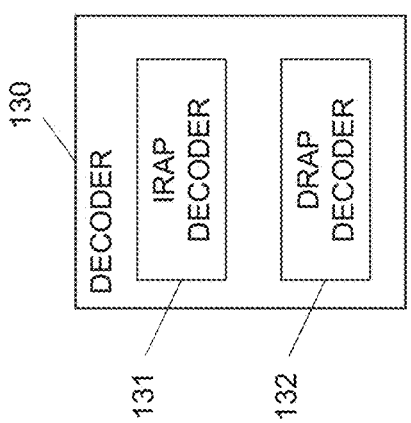
FIG. 19 is a schematic block diagram of a decoder according to a further embodiment.

FIG. 19 is a schematic block diagram of a decoder 130 with function modules. The decoder 130 comprises an IRAP decoder 131 for decoding an IRAP picture of a video bitstream. The decoder 130 also comprises a DRAP decoder 132 for decoding a DRAP picture of the video bitstream as a temporal predictive picture using the IRAP picture and/or a previous, according to a decoding order, DRAP picture in the video bitstream as sole reference picture(s) for the DRAP picture. The DRAP picture constitutes a random access point in the video bitstream.

Figure 22:
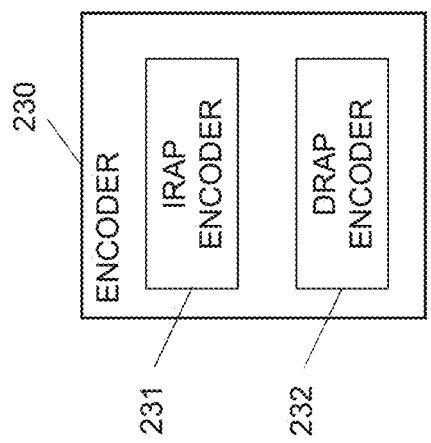
FIG. 22 is a schematic block diagram of an encoder according to a further embodiment.

FIG. 22 is a schematic block diagram of an encoder 230 with function modules. The encoder 230 comprises an IRAP encoder 231 for encoding an IRAP picture of a video stream. The encoder 230 also comprises a DRAP encoder 232 for encoding a DRAP picture of the video stream as a temporal predictive picture using the IRAP picture and/or a previous, according to a decoding order, DRAP picture in the video stream as sole reference picture(s) for the DRAP picture. The DRAP picture constitutes a random access point in a video bitstream of encoded pictures of the video stream.

A person skilled in the art would understand that even though HEVC has been used as base to describe the embodiments herein, the embodiments would work equally well for other video coding standards using temporal predictive coding including AVC/H.264, H.263, MPEG-4, VP8 and VP9.

An IRAP picture as described herein constitutes an intra random access point picture, i.e. a picture that constitutes and can thereby be used as a random access point and is encoded and decoded using spatial, i.e. intra, prediction and thereby comprises only intra coded blocks. As mentioned in the foregoing, according to the HEVC specification an IRAP picture could be in the form of an IDR picture, a CRA picture or a BLA picture. In other video coding standards, such as mentioned above, other particular picture type names may be used in order to define an intra random access point picture, such as key picture or key frame. However, also such other particular picture types are, for such other video coding standards, regarded as being encompassed by the expression IRAP picture as used herein as long as they constitute and can thereby be used as random access point and are encoded and decoded using spatial or intra prediction only. In video coding, pictures of a video stream are sometimes referred to as frames.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method of decoding pictures in a video bitstream, said method comprising:
    decoding an intra random access point, IRAP, picture of said video bitstream; and
    decoding a dependent random access point, DRAP, picture of said video bitstream as a temporal predictive picture using said IRAP picture and/or a previous, according to a decoding order, DRAP picture in said video bitstream as sole reference picture(s) for said DRAP picture, wherein said DRAP picture constitutes a random access point in said video bitstream, wherein an identifier of said IRAP picture is included in a reference picture set of said DRAP picture, said reference picture set signaling said IRAP picture as a short-term reference picture or a long-term reference picture.

2. The method according to claim 1, wherein decoding said DRAP picture comprises decoding said DRAP picture using a closest preceding, according to said decoding order, IRAP picture in said video bitstream as said sole reference picture for said DRAP picture.

3. The method according to claim 1, wherein decoding said DRAP picture comprises decoding blocks of said DRAP pictures as skip blocks using said IRAP picture and/or said previous DRAP picture as said sole reference picture(s) for said DRAP picture or as intra blocks.

4. The method according to claim 3, wherein decoding said DRAP picture comprises:
  decoding blocks of at least one slice in said DRAP picture as intra blocks; and
  decoding blocks of at least one slice in said DRAP picture as skip blocks using said IRAP picture and/or said previous DRAP picture as said sole reference picture(s) for said DRAP picture.

5. The method according to claim 1, further comprising decoding at least one non-random access point, non-RAP, picture of said video bitstream following said DRAP picture in output order and decoding order, said at least one non-RAP picture does not use any non-RAP picture preceding said DRAP picture in decoding order in said video bitstream as reference picture.

6. A method of encoding pictures in a video stream, said method comprising:
  encoding an intra random access point, IRAP, picture of said video stream; and
  encoding a dependent random access point, DRAP, picture of said video stream as a temporal predictive picture using said IRAP picture and/or a previous, according to a decoding order, DRAP picture in said video stream as sole reference picture(s) for said DRAP picture,
including an identifier of said IRAP picture in a reference picture set of said DRAP picture, said reference picture set signaling said IRAP picture as a short-term reference picture or a long-term reference picture, wherein said DRAP picture constitutes a random access point in a video bitstream of encoded pictures of said video stream.

7. The method according to claim 6, wherein encoding said DRAP picture comprises encoding said DRAP picture using a closest preceding, according to said decoding order, IRAP picture in said video stream as said sole reference picture for said DRAP picture.

8. The method according to claim 6, wherein encoding said DRAP picture comprises encoding blocks of said DRAP pictures as skip blocks using said IRAP picture and/or said previous DRAP picture as said sole reference picture(s) for said DRAP picture or as intra blocks.

9. The method according to claim 8, wherein encoding said DRAP picture comprises:
  encoding blocks of at least one slice in said DRAP picture as intra blocks; and
  encoding blocks of at least one slice in said DRAP picture as skip blocks using said IRAP picture and/or said previous DRAP picture as said sole reference pictures(s) for said DRAP picture.

10. The method according to claim 6, further comprising encoding intermediate pictures present in between said IRAP picture and said DRAP picture according to said decoding order.

11. The method according to claim 10, wherein encoding said DRAP picture comprises encoding blocks of said DRAP pictures as skip blocks using said IRAP picture and/or said previous DRAP picture as said sole reference picture(s) for said DRAP picture or as intra blocks, and wherein encoding said DRAP picture comprises encoding a block of said DRAP picture as a skip block using said IRAP picture as said sole reference picture for said DRAP picture if a collocated block in said IRAP picture is identical with or does not differ more than a defined threshold from a respective collocated block in said intermediate pictures and otherwise encoding said block of said DRAP picture as an intra block.

12. The method according to claim 8, wherein encoding said DRAP picture comprises encoding a block of said DRAP picture as a skip block using said IRAP picture as said sole reference picture for said DRAP picture if a collocated block in said IRAP picture is identical with or does not differ more than a defined threshold from a respective collocated block in another IRAP picture preceding said IRAP picture or in intermediate pictures between said another IRAP picture and said IRAP picture, otherwise encoding said block of said DRAP picture as an intra block.

13. The method according to claim 6, further comprising encoding at least one non-random access point, non-RAP, picture of said video stream following said DRAP picture in output order and decoding order, said at least one non-RAP picture does not use any non-RAP picture preceding said DRAP picture in decoding order in said video stream as reference picture.

14. The method according to claim 6, further comprising:
  performing encoding an IRAP picture of said video stream at a first periodic interval; and
  performing encoding a DRAP picture of said video stream at a second periodic interval that is shorter than said first periodic interval.

15. A decoder for decoding pictures in a video bitstream, the decoder comprising:
  a processor configured to perform operations comprising:
    decoding an intra random access point, IRAP, picture of said video bitstream;
    decoding a dependent random access point, DRAP, picture of said video bitstream as a temporal predictive picture using said IRAP picture and/or a previous, according to a decoding order, DRAP picture in said video bitstream as sole reference picture(s) for said DRAP picture, wherein said DRAP picture constitutes a random access point in said video bitstream; and
    decoding intermediate pictures present in between said IRAP picture and said DRAP picture according to said decoding order.

16. The decoder according to claim 15, wherein decoding the DRAP picture comprises decoding said DRAP picture using a closest preceding, according to said decoding order, IRAP picture in said video bitstream as said sole reference picture for said DRAP picture.

17. The decoder according to claim 15, wherein decoding the DRAP picture comprises decoding blocks of said DRAP pictures as skip blocks using said IRAP picture and/or said previous DRAP picture as said sole reference picture(s) for said DRAP picture or as intra blocks.

18. The decoder according to claim 17, wherein decoding the DRAP picture comprises:
  decoding blocks of at least one slice in said DRAP picture as intra blocks; and
  decoding blocks of at least one slice in said DRAP picture as skip blocks using said IRAP picture and/or said previous DRAP picture as said sole reference picture(s) for said DRAP picture.

19. The decoder according to claim 15, wherein the processor is configured to perform operations further comprising decoding at least one non-random access point, non-RAP, picture of said video bitstream following said DRAP picture in output order and decoding order, said at least one non-RAP picture does not use any non-RAP picture preceding said DRAP picture in decoding order in said video bitstream as reference picture.

20. The decoder according to claim 15, further comprising:
an IRAP decoder configured to decode said IRAP picture; and
a DRAP decoder configured to decode said DRAP picture.

21. The decoder according to claim 15 comprising:
a memory comprising instructions executable by said processor, wherein
said processor is operative to decode said IRAP picture; and
said processor is operative to decode said DRAP picture.

22. A decoder for decoding a video bitstream comprising:
an IRAP decoder configured to decode an intra random access point, IRAP, picture of said video bitstream; and
a DRAP decoder configured to decode a dependent random access point, DRAP, picture of said video bitstream as a temporal predictive picture using said IRAP picture and/or a previous, according to a decoding order, DRAP picture in said video bitstream as sole reference picture(s) for said DRAP picture, wherein said DRAP picture constitutes a random access point in said video bitstream, wherein an identifier of said IRAP picture is included in a reference picture set of said DRAP picture, said reference picture set signaling said IRAP picture as a short-term reference picture or a long-term reference picture.

23. An encoder for encoding pictures in a video stream, the decoder comprising:
a processor configured to perform operations comprising:
encoding an intra random access point, IRAP, picture of said video stream;
encoding a dependent random access point, DRAP, picture of said video stream as a temporal predictive picture using said IRAP picture and/or a previous, according to a decoding order, DRAP picture in said video stream as sole reference picture(s) for said DRAP picture, wherein said DRAP picture constitutes a random access point in a video bitstream of encoded pictures of said video stream; and
encoding intermediate pictures present in between said IRAP picture and said DRAP picture according to said decoding order.

24. The encoder according to claim 23, wherein encoding the DRAP picture comprises encoding said DRAP picture using a closest preceding, according to said decoding order, IRAP picture in said video stream as said sole reference picture for said DRAP picture.

25. The encoder according to claim 23, wherein encoding the DRAP picture comprises encoding blocks of said DRAP pictures as skip blocks using said IRAP picture and/or said previous DRAP picture as said sole reference picture(s) for said DRAP picture or as intra blocks.

26. The encoder according to claim 25, wherein encoding the DRAP picture comprises:
encoding blocks of at least one slice in said DRAP picture as intra blocks; and
encoding blocks of at least one slice in said DRAP picture as skip blocks using said IRAP picture and/or said previous DRAP picture as said sole reference picture(s) for said DRAP picture.

27. The encoder according to claim 23, wherein the processor is configured to perform operations further comprising:
encoding blocks of said DRAP pictures as skip blocks using said IRAP picture and/or said previous DRAP picture as said sole reference picture(s) for said DRAP picture or as intra blocks, and
encoding a block of said DRAP picture as a skip block using said IRAP picture as said sole reference picture for said DRAP picture if a collocated block in said IRAP picture is identical with or does not differ more than a defined threshold from a respective collocated block in said intermediate pictures and otherwise encode said block of said DRAP picture as an intra block.

28. The encoder according to claim 25, wherein the processor is configured to perform operations further comprising encoding a block of said DRAP picture as a skip block using said IRAP picture as said sole reference picture for said DRAP picture if a collocated block in said IRAP picture is identical with or does not differ more than a defined threshold from a respective collocated block in another IRAP picture preceding said IRAP picture or in intermediate pictures between said another IRAP picture and said IRAP picture, otherwise encoding said block of said DRAP picture as an intra block.

29. The encoder according to claim 23, wherein the processor is configured to perform operations further comprising encoding at least one non-random access point, non-RAP, picture of said video stream following said DRAP picture in output order and decoding order, said at least one non-RAP picture does not use any non-RAP picture preceding said DRAP picture in decoding order in said video stream as reference picture.

30. The method according to claim 23, wherein the processor is configured to perform operations further comprising:
including an identifier of said IRAP picture in a reference picture set of said DRAP picture, said reference picture set signaling said IRAP picture as a short-term reference picture or a long-term reference picture.

31. The method according to claim 23, wherein the processor is configured to perform operations further comprising:
performing encoding an IRAP picture of said video stream at a first periodic interval; and
performing encoding a DRAP picture of said video stream at a second periodic interval that is shorter than said first periodic interval.

32. The encoder according to claim 23, further comprising:
an IRAP encoder configured to encoder said IRAP picture; and
a DRAP encoder configured to encoder said DRAP picture.

33. The encoder according to claim 23 further comprising:
a memory comprising instructions executable by said processor,
wherein said processor is configured to encode said IRAP picture; and
wherein said processor is configured to encode said DRAP picture.

34. An encoder for encoding a video stream comprising:
an IRAP encoder configured to encode an intra random access point, IRAP, picture of said video stream; and
a DRAP encoder configured to encode a dependent random access point, DRAP, picture of said video stream as a temporal predictive picture using said IRAP picture and/or a previous, according to a decoding order, DRAP picture in said video stream as sole reference picture(s) for said DRAP picture, wherein said DRAP picture constitutes a random access point in a video bitstream of encoded pictures of said video stream, wherein an identifier of said IRAP picture is included in a reference picture set of said DRAP picture, said reference picture set signaling said IRAP picture as a short-term reference picture or a long-term reference picture.

35. A non-transitory computer readable tangible medium storing program code, which when executed by a processor, cause said processor to perform operations comprising:
   decoding an intra random access point, IRAP, picture of a video bitstream; and
   decoding a dependent random access point, DRAP, picture of said video bitstream as a temporal predictive picture using said IRAP picture and/or a previous, according to a decoding order, DRAP picture in said video bitstream as sole reference picture(s) for said DRAP picture, wherein said DRAP picture constitutes a random access point in said video bitstream, wherein an identifier of said IRAP picture is included in a reference picture set of said DRAP picture, said reference picture set signaling said IRAP picture as a short-term reference picture or a long-term reference picture.

36. A non-transitory computer readable tangible medium storing program code, which when executed by a processor, cause said processor to perform operations comprising:
   encoding an intra random access point, IRAP, picture of a video stream; and
   encoding a dependent random access point, DRAP, picture as a temporal predictive picture suing said IRAP picture and/or a previous, according to a decoding order, DRAP picture in said video stream as sole reference picture(s) for said DRAP picture, wherein said DRAP picture constitutes a random access point in a video bitstream of encoded pictures of said video stream, wherein an identifier of said IRAP picture is included in a reference picture set of said DRAP picture, said reference picture set signaling said IRAP picture as a short-term reference picture or a long-term reference picture.

* * * * *

UNITED STATES PATENT AND TRADEMARK OFFICE
CERTIFICATE OF CORRECTION

PATENT NO. : 9,832,463 B2
APPLICATION NO. : 14/646713
DATED : November 28, 2017
INVENTOR(S) : Pettersson et al.

Page 1 of 1

It is certified that error appears in the above-identified patent and that said Letters Patent is hereby corrected as shown below:

In the Specification

In Column 12, Line 20, delete "loin" and insert -- in --, therefor.

In Column 15, Line 6, delete "IRAP" and insert -- DRAP --, therefor.

In Column 18, Line 9, delete "Comprises:" and insert -- comprises: --, therefor.

In Column 19, Line 64, delete "100 decoder" and insert -- decoder 100 --, therefor.

In the Claims

In Column 30, Line 32, in Claim 30, delete "method" and insert -- encoder --, therefor.

In Column 30, Line 39, in Claim 31, delete "method" and insert -- encoder --, therefor.

Signed and Sealed this
First Day of September, 2020

Andrei Iancu
*Director of the United States Patent and Trademark Office*